ized Patent

United States Patent
Hirakawa et al.

(10) Patent No.: US 10,497,079 B2
(45) Date of Patent: Dec. 3, 2019

(54) ELECTRONIC DEVICE AND METHOD FOR MANAGING IMAGE

(71) Applicant: TOSHIBA CLIENT SOLUTIONS CO., LTD., Koto-ku, Tokyo (JP)

(72) Inventors: Daisuke Hirakawa, Saitama Saitama (JP); Yuuji Irimoto, Fussa Tokyo (JP); Takako Suzuki, Tokyo (JP)

(73) Assignee: Toshiba Client Solutions Co., Ltd., Tokyo (JP)

( * ) Notice: Subject to any disclaimer, the term of this patent is extended or adjusted under 35 U.S.C. 154(b) by 247 days.

(21) Appl. No.: 15/288,771

(22) Filed: Oct. 7, 2016

(65) Prior Publication Data

US 2017/0123637 A1    May 4, 2017

Related U.S. Application Data

(60) Provisional application No. 62/239,071, filed on Oct. 8, 2015.

(51) Int. Cl.
*G06F 3/0482* (2013.01)
*G06T 1/00* (2006.01)

(52) U.S. Cl.
CPC .......... *G06T 1/0007* (2013.01); *G06F 3/0482* (2013.01); *G06T 2200/24* (2013.01)

(58) Field of Classification Search
CPC ............................ G06F 3/0482; G06T 1/0007
USPC ....................................................... 715/781
See application file for complete search history.

(56) References Cited

U.S. PATENT DOCUMENTS

| | | | | |
|---|---|---|---|---|
| 6,785,786 B1* | 8/2004 | Gold et al. | .......... | G06F 11/1461 711/162 |
| 7,376,696 B2* | 5/2008 | Bell et al. | ............. | G06F 3/0486 709/203 |
| 2008/0282142 A1* | 11/2008 | Butlin | ....................... | G06F 8/38 715/234 |
| 2009/0201316 A1* | 8/2009 | Bhatt | ...................... | G06F 9/451 345/660 |
| 2011/0066966 A1* | 3/2011 | Worrall et al. | ....... | G06F 17/211 715/776 |
| 2014/0075354 A1* | 3/2014 | Ko | ...................... | G06F 3/04883 715/769 |

FOREIGN PATENT DOCUMENTS

| | | |
|---|---|---|
| JP | 06-052283 | 2/1994 |
| JP | 2002-149701 | 5/2002 |
| JP | 2003-085528 | 3/2003 |
| JP | 2004-032787 | 1/2004 |
| JP | 2008-003887 | 1/2008 |
| JP | 2011-164798 | 8/2011 |

\* cited by examiner

*Primary Examiner* — Stephen S Hong
*Assistant Examiner* — Broderick C Anderson
(74) *Attorney, Agent, or Firm* — Rutan & Tucker, LLP

(57) ABSTRACT

According to one embodiment, an electronic apparatus includes a storage medium, a display and a hardware processor. The storage medium stores first images in a first directory. The hardware processor displays the first images on a screen of the display, moves at least one second image of the first images from the first directory to a second directory in the storage medium, the at least one second image selected by a user and displays at least one third image on the screen after the at least one second image is moved to the second directory, the at least one third image obtained by excluding the at least one second image from the first images.

20 Claims, 18 Drawing Sheets

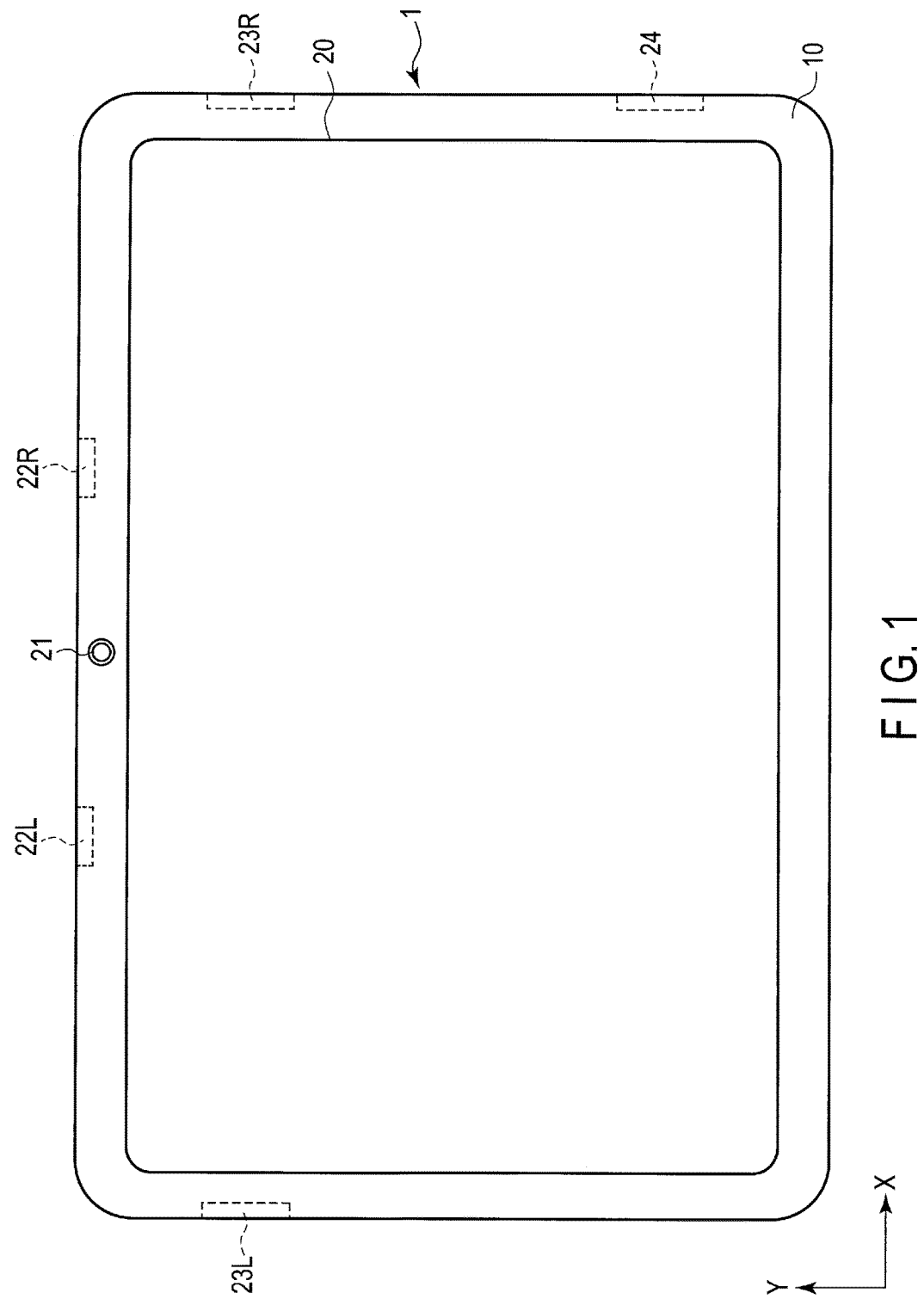
F I G. 1

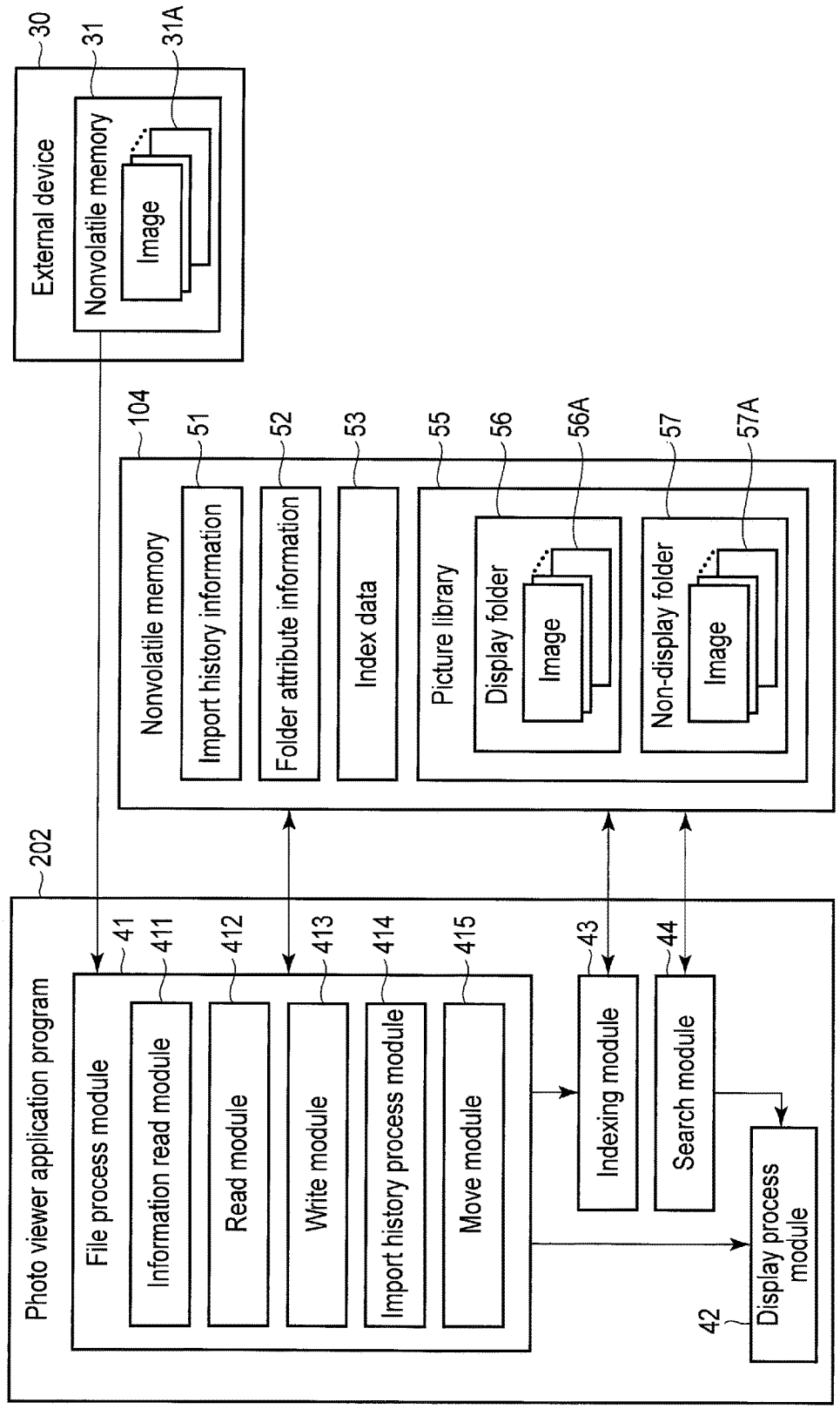
F I G. 3

| Device ID | Last import date and time |
|---|---|
| 0001 | 2015/08/18 20:10:05 |
| 0159 | 2015/09/02 16:44:38 |
| ⋮ | ⋮ |

FIG. 4

| Folder name (path) | Attribute |
|---|---|
| Default display folder | Display |
| Default non-display folder | Non-display |
| User set non-display folder | Non-display |
| ⋮ | ⋮ |

FIG. 5

| Image ID | Capturing date and time | Capturing place | Event name | Face image information ||||||| |
| --- | --- | --- | --- | --- | --- | --- | --- | --- | --- | --- |
| | | | | Face image | Feature | Smiling degree | Position | Size | Person ID | Others |
| 0001 | ⋮ | ⋮ | ⋮ | ⋮ | ⋮ | ⋮ | ⋮ | ⋮ | ⋮ | ⋮ |
| 0002 | ⋮ | ⋮ | ⋮ | ⋮ | ⋮ | ⋮ | ⋮ | ⋮ | ⋮ | ⋮ |
| 0003 | ⋮ | ⋮ | ⋮ | ⋮ | ⋮ | ⋮ | ⋮ | ⋮ | ⋮ | ⋮ |
| 0004 | ⋮ | ⋮ | ⋮ | ⋮ | ⋮ | ⋮ | ⋮ | ⋮ | ⋮ | ⋮ |
| 0005 | ⋮ | ⋮ | ⋮ | ⋮ | ⋮ | ⋮ | ⋮ | ⋮ | ⋮ | ⋮ |
| 0006 | ⋮ | ⋮ | ⋮ | ⋮ | ⋮ | ⋮ | ⋮ | ⋮ | ⋮ | ⋮ |
| ⋯ | ⋯ | ⋯ | ⋯ | ⋯ | ⋯ | ⋯ | ⋯ | ⋯ | ⋯ | ⋯ |

F I G. 6

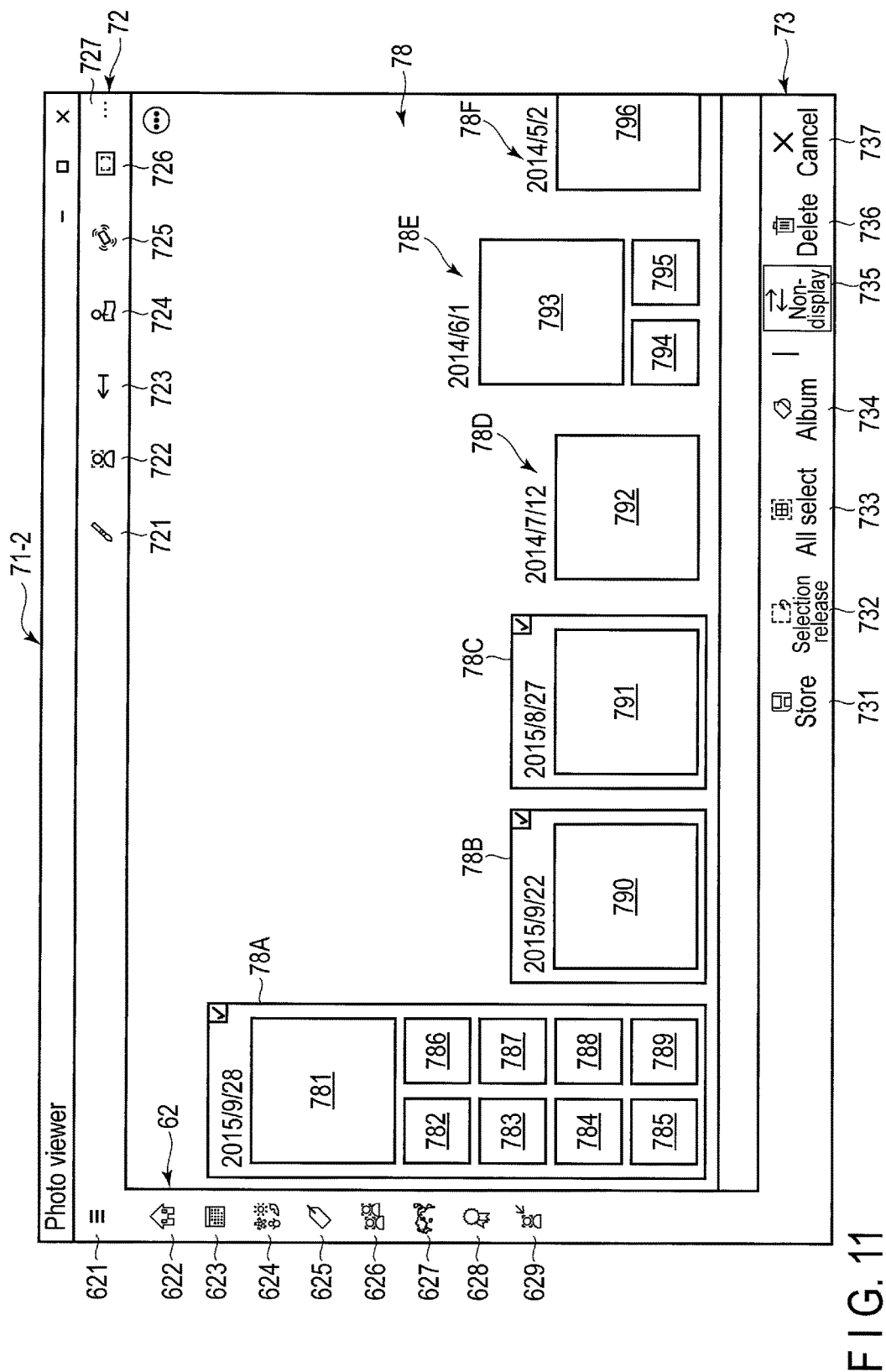
F I G. 11

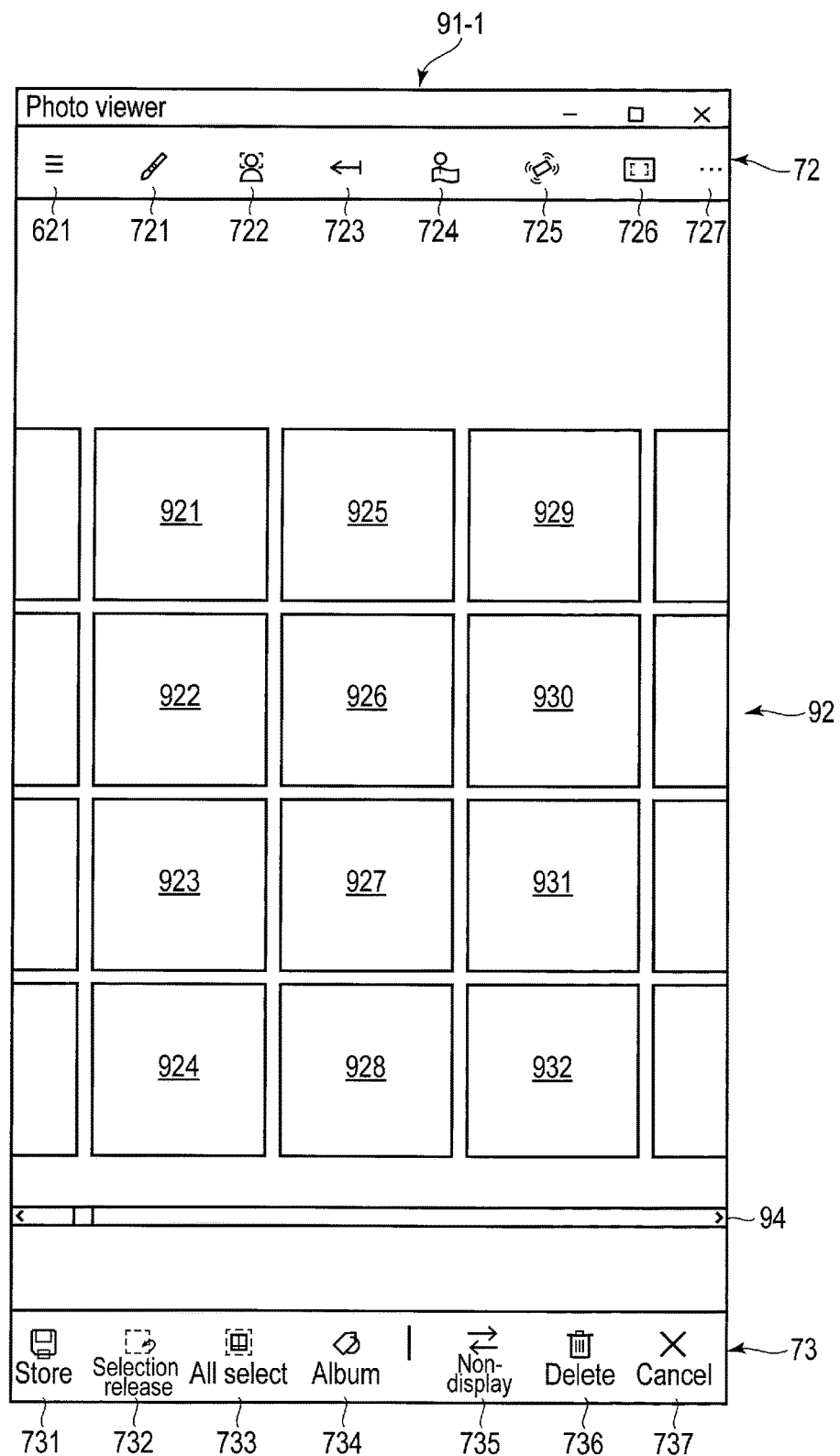
F I G. 14

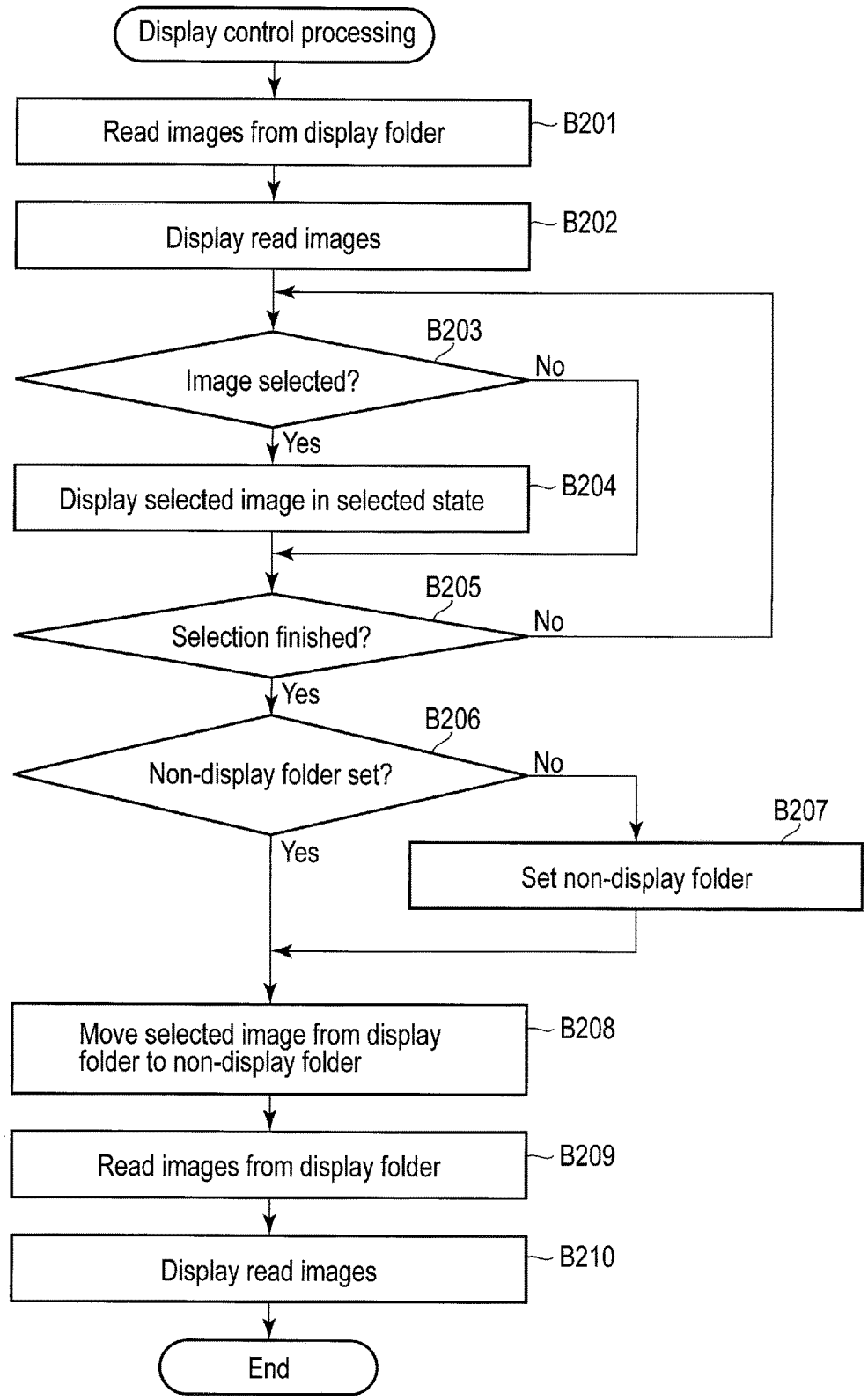
F I G. 19

ELECTRONIC DEVICE AND METHOD FOR MANAGING IMAGE

CROSS-REFERENCE TO RELATED APPLICATIONS

This application claims the benefit of U.S. Provisional Application No. 62/239,071, filed Oct. 8, 2015, the entire contents of which are incorporated herein by reference.

FIELD

Embodiments described herein relate generally to a technique for managing a group of images such as photographs.

BACKGROUND

In recent years, in accordance with the spread of digital cameras and mobile devices (for example, smartphones and tablets) that include or a camera function, even a general user often has an opportunity to manage many images (photographs).

In view of this, various photograph browsing applications capable of assisting the user to detect a desired image from a large number of images have been proposed. The photograph browsing applications include a typical function of display a list of images. The user can browse images in the list or can select a desired image from the list.

It should be noted that, when many images are managed, considerable time may be required to import image data from, for example, a digital camera or a mobile device, and/or to read image data from a storage device. In this case, images cannot be quickly displayed to reduce the convenience.

There is a demand for a new technique of managing a large number of images without reducing the convenience of users.

BRIEF DESCRIPTION OF THE DRAWINGS

A general architecture that implements the various features of the embodiments will now be described with reference to the drawings. The drawings and the associated descriptions are provided to illustrate the embodiments and not to limit the scope of the invention.

FIG. 1 is an exemplary view showing the appearance of an electronic device according to an embodiment.

FIG. 3 is a block diagram showing an exemplary functional configuration of a photo viewer application program executed by the electronic device.

FIG. 4 is a view showing exemplary import history information used by the electronic device executing the photo viewer application program.

FIG. 5 is a view showing exemplary folder attribute information used by the electronic device executing the photo viewer application program.

FIG. 6 is a view showing exemplary index data used by the electronic device executing the photo viewer application program.

FIG. 11 is a view for explaining non-display setting for each folder on an image list view for respective folders displayed by the electronic device executing the photo viewer application program.

FIG. 14 is a view showing an exemplary image list view displayed on a portrait screen by the electronic device executing the photo viewer application program.

FIG. 19 is a flowchart showing the procedure of display control processing.

DETAILED DESCRIPTION

Figure 2:
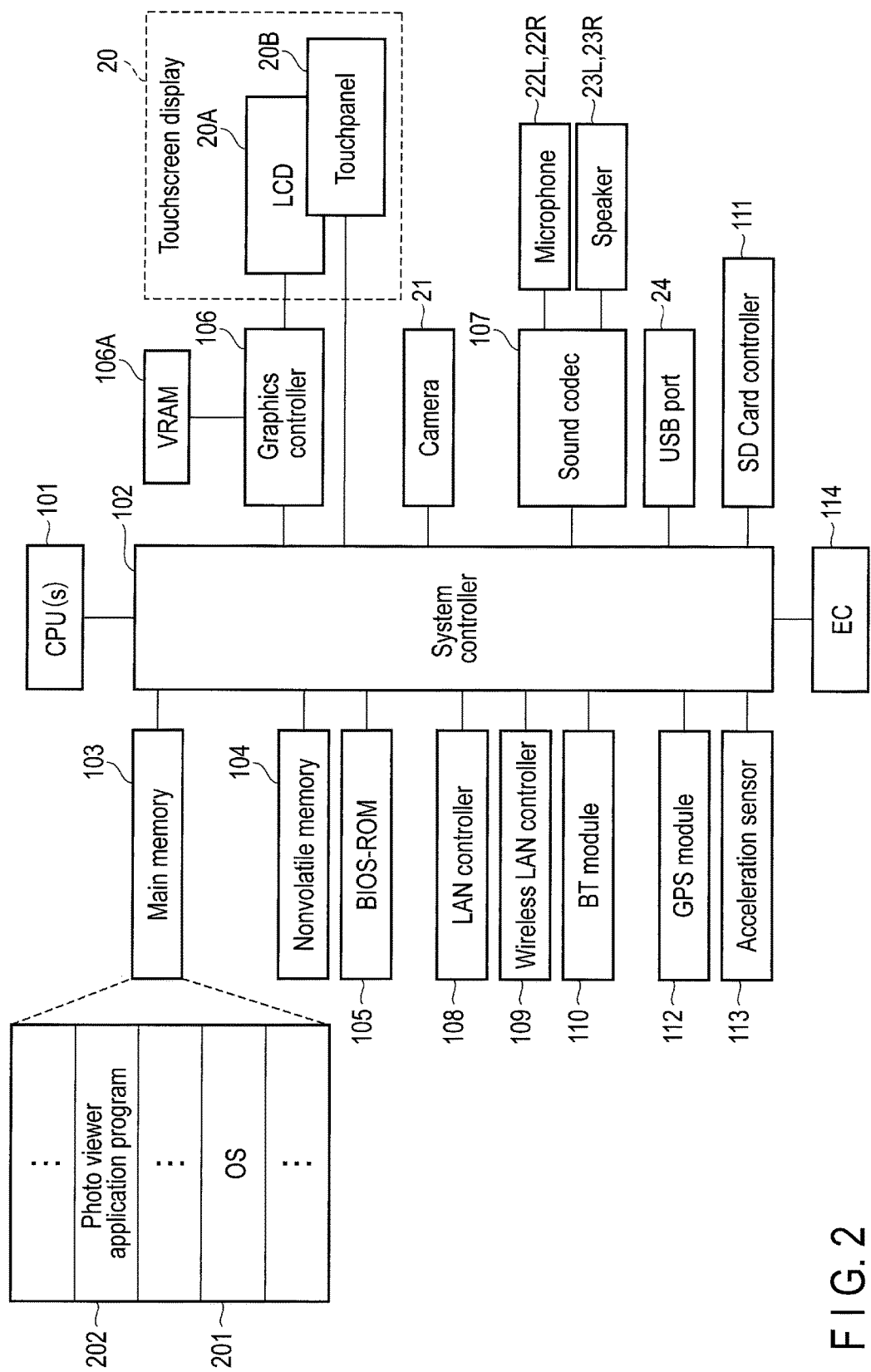
FIG. 2 is a block diagram showing an exemplary system configuration of the electronic device.

Various embodiments will be described hereinafter with reference to the accompanying drawings.

In general, according to one embodiment, an electronic device includes a storage medium, a display and a hardware processor. The storage medium stores first images in a first directory. The hardware processor is configured to: display the first images on a screen of the display; move at least one second image of the first images from the first directory to a second directory in the storage medium, the at least one second image selected by a user; and display at least one third image on the screen after the at least one second image is moved to the second directory, the at least one third image obtained by excluding the at least one second image from the first images.

The electronic device of the embodiment may be realized as a tablet computer, a notebook computer, a desktop computer, a smartphone, a personal digital assistant (PDA), etc. In the embodiment, it is assumed that the electronic device is realized as a tablet computer 1.

FIG. 1 shows an example of an appearance of the tablet computer 1. As shown in FIG. 1, the tablet computer 1 includes a main body 10 and a touchscreen display 20. The main body 10 is provided with a camera 21, microphones 22L and 22R, speakers 23L and 23R, a USB port 24, etc.

The camera 21 is located at a predetermined position on the main body 10, for example, at the middle of the upper end of the front surface of the main body 10. The camera 21 may be provided on the rear surface of the main body 10.

Further, cameras 21 may be provided on both of the front and rear surfaces of the main body 11.

Microphones 22L and 22R are arranged at two predetermined positions on the main body 10, for example, at two separate positions on the upper end of the front surface of the main body 10. The camera 21 may be arranged between two microphones 22L and 22R. Instead, only one microphone may be provided.

Speakers 23L and 23R are arranged at two predetermined positions, for example, on left and right sides of the main body 10.

The USB port 24 is provided at a predetermined position on the main body 10, for example, on the right side of the main body 10.

The touchscreen display 20 includes a liquid crystal display (LCD) unit and a touchpanel. The touchpanel is attached to the front surface of the main body 10 to cover the LCD screen.

The touchscreen display 20 detects a touch position, touched by an external object (a stylus or finger), on the screen of the touchscreen display 20. The touchscreen display 20 may support a multi-touch function of simultaneously detecting touch positions.

The touchscreen display 20 can display on a screen some icons for starting various application programs. These icons may include an icon for starting a photo viewer application program. The photo viewer application program includes instructions for managing a large number of images (photographs).

FIG. 2 shows the system configuration of the tablet computer 1.

As shown in FIG. 2, the tablet computer 1 includes a CPU (or CPUs) 101, a system controller 102, a main memory 103, a nonvolatile memory 104, a BIOS-ROM 105, a graphics controller 106, a video RAM (VRAM) 106A, a sound codec 107, a LAN controller 108, a wireless LAN controller 109, a Bluetooth (registered trademark) module (BT module) 110, an SD card controller 111, a GPS module 112, an acceleration sensor 113, an embedded controller (EC) 114, etc.

The CPU 101 is a processor for controlling the operations of various components in the tablet computer 10. The processor includes a circuit (processing circuit). The computer 10 may include CPUs 101. Each CPU 101 executes various programs loaded from the nonvolatile memory 104 onto the main memory 103. The programs include an operating system (OS) 201 and various application programs. The application programs include a photo viewer application program 202.

Some features of the photo viewer application program 202 will be described.

The photo viewer application program 202 includes import instructions for receiving images from a digital camera, external storage (a USB flash memory, an SD Card, etc.), a mobile device (smartphone), etc., and storing the images in a predetermined directory (also called a folder) in a storage medium (such as the nonvolatile memory 104). Each image is a graphics file in JPEG or another file format. Each image file includes digital image data and metadata. The metadata includes date and time data indicative of a time and date at which the image was captured, and position data indicative of a location in which the image was captured. The image may be a video.

The computer 1 may repeatedly import images from some external devices, for example, whenever an event occurs. However, it is troublesome for a user to select necessary images from images in an external device whenever the external device is connected to the computer 1.

It is possible to detect images already imported from the external device to the computer 1, by comparing the images in the external device with those in the computer 1. However, if a large number of images exist, the comparison processing requires large-capacity resources, such as the CPU 101 and the memory 103, and considerable processing time.

In light of this, in the computer 1 executing the photo viewer application program 202 of the embodiment, the date and time, when an image was last imported from an external device, is stored, and when further images are read from the external device next time, images produced (added) after the date and time of the last imported images are displayed so that they can be discriminated from the other images (i.e., the images produced before the date and time of the last imported images). For instance, when a list of images stored in the external device connected to the computer 1 is displayed on the screen, the images produced (added) after the date and time of the last imported images are displayed in a selected state, while the other images (i.e., the images produced before the date and time of the last imported images) are displayed in a non-selected state. Upon receiving an instruction to start import, the images in the selected state are imported from the external device.

As described above, the images expected by the user to be import into the computer 1 is automatically set in a selected state by displaying, in a selected state, the images produced after the date and time of the image last imported from the external device. Since the user can easily detect that the images displayed in the selected state are not yet imported into the computer 1, images are prevented from being imported in duplicate, and the user can save the step of selecting images.

Moreover, the photo viewer application program 202 includes display/non-display setting instructions for setting whether each managed image is displayed on the screen, in accordance with an operation by the user. This structure enables images set in the non-display state to be kept stored in the computer 1 and not to be displayed on the screen normally. For instance, the photo viewer application program 202 may include instructions for setting, when images have substantially the same content, only one of the images in a "display" state, and the other images in a "non-display" state. The photo viewer application program 202 includes may also include instructions for setting, in the "non-display" state, an image failed in photography, such as a blurred image or an image out of focus.

For setting display/non-display of images, a method of imparting an attribute of "display" or "non-display" to each image (image file) is considered. However, during processing of display an image or a list of images, if it is determined whether each image has an attribute "display" or "non-display," considerable time may be required for the processing.

To avoid the above, the photo viewer application program 202 of the embodiment includes instructions for causing the nonvolatile memory 104 to store images as display targets in a display folder, and causing the nonvolatile memory 104 to store, in a non-display folder, images that are not display targets (namely, images as non-display targets). Since images are read from the display folder, and images in the non-display folder are not accessed, the computer 1 executing the photo viewer application program 202 can more quickly display images as display targets or its list than in a case where it accesses a folder where images of "display" and "non-display" attributes are mixed.

Furthermore, the photo viewer application program 202 includes instructions for moving, when an image is newly set as a non-display target while images as display targets or a list of them is displayed, the new non-display target image to the non-display folder. This can avoid unnecessary access to the image set as the non-display target.

The photo viewer application program 202 also includes search instructions. The CPU 101 executing the photo viewer application program 202 can perform searching based on face images. More specifically, the program 202 includes instructions for searching a group of image for images each including a face image similar to a face image designated as a search key, or for images each including a smiling face.

The import instructions, the display/non-display setting instructions and the search instructions included in the photo viewer application program 202 can be incorporated in a circuit such as a processor. Alternatively, these instructions can also be incorporated in respective dedicated circuits.

The CPU 101 also executes a basic input/output system (BIOS) stored in the BIOS-ROM 105. The BIOS is a program for hardware control.

The system controller 102 is a device that connects the local bus of the CPU 101 to various components. The system controller 102 further includes a memory controller for controlling access to the main memory 103. The system controller 102 also has a function of communicating with the graphics controller 106 through, for example, a serial bus conforming to the PCI EXPRESS standard.

The system controller 102 contains an ATA controller for controlling the nonvolatile memory 104. The system controller 102 contains a USB controller for controlling various USB devices. The system controller 102 further has a function of communicating with the sound codec 107.

The graphics controller 106 is a display controller configured to control the LCD 20A of the touchscreen display 20. The display controller includes a circuit (display control circuit). The graphics controller 106 receives, from the CPU 101, data for display on the LCD 20A, and transmits it to the VRAM 106A. The graphics controller 106 generates a display signal to be output to the LCD 20A using data stored in the VRAM 106A. The graphics controller 106 sends the generated display signal to the LCD 20A. The graphics controller 106 may be built in the system controller 102.

The LCD 20A displays a screen image based on the display signal. A touchpanel 20B covering the LCD 20A functions as a sensor configured to detect a touch position between the screen of the LCD 20A and an external object.

The sound codec 107 is a sound controller configured to process sound data. The sound codec 107 converts audio data as a reproduction target into an analog signal, and supplies the analog signal to a headphone or the speakers 23L and 23R. The sound codec 107 also converts, into a digital signal, an analog signal input from the microphones 22L and 22R.

The LAN controller 108 is a wired communication device configured to execute wired communication conforming to, for example, the IEEE 802.3 standard. The LAN controller 108 includes a transmission circuit configured to transmit signals, and a reception circuit configured to receive signals. The wireless LAN controller 109 is a wireless communication device configured to execute wireless communication conforming to, for example, the IEEE 802.11 standard. The wireless LAN controller 109 includes a transmission circuit configured to transmit signals by radio, and a reception circuit configured to receive signals by radio. The BT module 110 is a wireless communication device configured to execute wireless communication conforming to the Bluetooth standard.

The SD Card controller 111 has a function of communicating with a connected SD Card. The GPS module 112 receives a GPS signal and calculates the present position (latitude/longitude) of the computer 1 using the GPS signal. The acceleration sensor 113 is used to detect the present orientation (portrait orientation or landscape orientation) of the main body 10, and to detect a shaking operation of the main body 10.

The EC 114 is a single-chip microcomputer including an embedded controller for management of electric power. The EC 114 powers on or off the tablet computer 1 in response to an operation of a power button by a user.

FIG. 3 shows the functional configuration of the photo viewer application program 202. The CPU 101 executing the photo viewer application program 202 can manage a large number of images (image files) by executing the above-described import instructions, display/non-display setting instructions, and search instructions.

The photo viewer application program 202 includes, as functional modules, a file process module 41, a display process module 42, an indexing module 43 and a search module 44, as is shown in FIG. 3. The file process module 41 includes an information read module 411, a read module 412, a write module 413, an import history process module 414, and a move module 415.

The CPU 101 executing the photo viewer application program 202 manages images stored in a picture library 55 in the nonvolatile memory 104 (storage medium). The picture library 55 includes a display folder (first directory) 56 storing images as display targets, and a non-display folder (second directory) 57 storing images that are not display targets. The picture library 55 may include display folders 56 and non-display folders 57.

Each of the modules 41, 42, 43 and 44 in the photo viewer application program 202 includes instructions for receiving various events from the touchpanel 20B through a touchpanel driver provided in the OS 201. These events include a touch event, a move event and a release event. The touch event is an event indicating that an external object is brought into contact with the screen of the touchscreen display 20. The touch event includes coordinates indicative of the contact position of the screen and the external object. The move event is an event indicating that the contact position is moved with the external object kept in contact with the screen. The move event includes the coordinates of the contact position of the destination. The release event is an event indicating that the contact between the external object and the screen has been released. The release event includes coordinates indicative of a release position at which the contact is released.

Each of the modules 41, 42, 43, and 44 in the photo viewer application program 202 includes instructions for detecting where on the screen and which finger gesture (tapping, double tapping, tapping and holding, swiping, panning, pinching, stretching, etc.) has been performed.

The file process module 41 and the display process module 42 include the above-described import instructions.

More specifically, the information read module 411 includes instructions for receiving information from an external device 30 connected to the computer 10. The information read module 411 includes instructions for receiving, for example, device ID from the connected external device 30, and receiving attribute information on a file stored in the external device 30. The attribute information on the file includes, for example, a file name, the updated date of the file and the format (extension) of the file. It is assumed here that an image file is stored in the external device 30.

The import history process module 414 includes instructions for managing histories of image imports corresponding to respective external devices. The import history process module 414 includes instructions for reading the date and time when an image (image file) was last read from the connected external device 30, using the device ID and import history information 51 stored in the nonvolatile memory 104.

As shown in FIG. 4, the import history information 51 includes at least one record corresponding to at least one external device from which the computer 1 read an image until now. Each record includes a "device ID" field and a "last import date and time" field.

The "device ID" field stores identification data (ID) allocated to a corresponding external device. The "last import date and time" field stores a date and time at which an image was last read from the corresponding external devices. Alternatively, the "last import date and time" field may store newest updated date and time of files read by the CPU 101 executing the information read module 411 so far from the external device.

The import history process module 414 includes instructions for reading, if the import history information 51 includes a record corresponding to the received device ID of the external device 30, a value of the "last import date and time" of the record.

The display process module 42 includes instructions for displaying on a screen an import view including items (for example, an image, a thumbnail image, text, an icon) that indicate images (files) stored in the external device 30, using the file attribute information read by the CPU 101 executing the information read module 411. The display process module 42 includes instructions for displaying, in a selected state, an item of the items which indicates an image produced after the last import date and time read by the CPU 101 executing the import history process module 414. The display process module 42 includes instructions for drawing, for example, an element indicating that the item of the image produced after the last import date and time is in the selected state. The element indicative of the selected state is, for example, a check box with a check mark.

Moreover, in order to indicate that the items of images produced before the last import date and time are not in the selected state (that is, they are in a non-selected state), the display process module 42 may include instructions for drawing check boxes with no check marks for the respective items.

A user can change each displayed item from the selected state to the non-selected state, or change each displayed item from the non-selected state to the selected state, by, for example, tapping each item. The display process module 42 includes instructions for drawing, in accordance with the tapping operation of the user, an element indicative of the selected or non-selected state.

The read module 412 includes instructions for requesting, in accordance with an operation to instruct start of importing of an image (or images) from the external device 30, the external device 30 to transmit an image (file) corresponding to an item in the selected state among the items displayed in the import view. In response to the request from the CPU 101 executing the read module 412 (computer 1), the external device 30 reads, from the nonvolatile memory 31, an image corresponding to the item set in the selected state, and transmits it to the CPU 101 executing the read module 412 (computer 1). The read module 412 includes instructions for receiving, from the external device 30, the image corresponding to the item set in the selected state.

The write module 413 includes instructions for causing, in accordance with an operation of instructing start of image importing, the nonvolatile memory 104 to store the image, received from the external device 30, in the display folder 56 of the picture library 55. The write module 413 includes instructions for determining the display folder 56 for storing the image as a display target, using, for example, the folder attribute information 52 in the nonvolatile memory 104, and causing the nonvolatile memory 104 to store the image in the display folder 56.

FIG. 5 shows an example of the folder attribute information 52. The folder attribute information 52 is data on folders (directories) associated with the photo viewer application program 202. In each folder, images managed by the CPU 101 executing the photo viewer application program 202 are stored.

The table of the folder attribute information 52 includes records corresponding to folders. Each record includes a "folder name" field and an "attribute" field.

The "folder name" field stores the name of a corresponding folder. The "folder name" field may store the path of the corresponding folder. The "attribute field" stores an attribute indicating whether images included in the corresponding folder are displayed on the screen, i.e., stores "display" or "non-display."

In the example shown in FIG. 5, a "default display folder" is set as a "display" attribute, and a "default non-display folder" and a "user setting non-display folder" are set as a "non-display" attribute. In this case, the write module 413 includes instructions for detecting the default display folder 56 set to the "display" attribute, using the folder attribute information 52.

The write module 413 may include instructions for creating a new display folder 56 for a to-be-imported image in accordance with an operation of instructing start of image importing. This display folder 56 is produced in, for example, the picture library 55, and a name based on the date of the creation (for example, "2015-09-25") is attached to the produced folder 56.

The import history process module 414 includes instructions for writing, in the import history information 51, a record including the device ID and a last import date and time in accordance with a signal indicative of the completion of importing of an image (or images) from the external device 30. More specifically, the import history process module 414 includes instructions for overwriting, if the import history information 51 includes the record corresponding to the device ID of the connected external device 30, in a "last import date and time" field in the record, a date and time when the image is stored in the display folder 56 (i.e., the date and time when the import is completed). Moreover, the import history process module 414 includes instructions for adding, if the import history information 51 does not include the record corresponding to the device ID of the connected external device 30, to the import history information 51, a new record including the device ID and the last import date and time.

By virtue of the above structure, the image stored in the external device 30 can be efficiently imported into the computer 1.

The file process module 41 and the display process module 42 also include the above-mentioned image display/non-display setting instructions. The file process module 41 and the display process module 42 include instructions for setting whether an image managed by the CPU 101 executing the photo viewer application program 202 is displayed on the screen.

The read module 412 and the display process module 42 include instructions for displaying on the screen, images (first images) 56A stored in the display folder (first directory) 56 in the nonvolatile memory 104. The move module 415 includes instructions for moving at least one image (second image) of the displayed images, which is selected by the user, from the display folder 56 to the non-display folder 57 (second directory). The display process module 42 includes instructions for displaying, after the move operation, images (third images) obtained by excluding the moved image (or images) from the displayed images. Thus, the image selected by the user can be set as a non-display image.

More specifically, the read module 412 includes instructions for reading images 56A from the display folder 56. The read module 412 includes instructions for reading images from a folder, which is included in at least one folder indicated by the folder attribute information 52, and in which the "display" attribute is set.

The display process module 42 includes instructions for displaying on the screen an image list view including a thumbnail images corresponding to the read images.

The user can set an image (thumbnail image) of the displayed image list view in a selected state by a tapping operation. The image set in the selected state is an image that the user wants to set as a non-display image. The display process module 42 includes instructions for drawing, for the tapped image, an element indicating that the image is in the selected state. The element indicative of the selected state is, for example, a check box with a check mark input.

The display process module 42 may include instructions for drawing a check box with no check mark for an image that is not selected. The display process module 42 may include instructions for drawing, when display of the image list view is started, a check box with no check mark for each image.

The user can switch the state of an image in the image list view from the selected state to the non-selected state or switch the state of an image in the image list view from the non-selected state to the selected state, by, for example, tapping operation of the image. The display process module 42 includes instructions for drawing, in accordance with the user tapping an image, for the image, an element indicative of the selected state or an element indicative of the non-selected state.

The move module 415 includes instructions for moving, in accordance with an operation of instructing non-display setting of an image (or images), an image (file) of the image list view, set in the selected state, from the display folder 56 to the non-display folder 57 in the nonvolatile memory 104 (picture library 55). Since the image set in the selected state is moved from the display folder 56 to the non-display folder 57, it is not included in the display folder 56 after the move operation. Since thus, the image set as a non-display image is moved to the non-display folder 57, image files can be managed more intuitively than when an attribute of display or non-display is attached to each image. The non-display folder 57 may be a folder produced beforehand, or a folder newly produced or set in accordance with an operation of instructing non-display setting of an image (or images).

Further, the display folder 56, and the non-display folder 57, to which an image (or images) in the display folder 56 is moved, may be associated with each other. By this association, the image moved to the non-display folder 57 can be easily returned to the display folder 56.

The read module 412 includes instructions for reading, after the image is moved, images 56A from the display folder 56. The display process module 42 includes instructions for displaying, on the screen, an image list view including a thumbnail images corresponding to the read images. That is, the display process module 42 includes instructions for updating the currently displayed image list view, using the newly read images.

To update the image list view without reading images from the display folder 56, the display process module 42 may include instructions for deleting, from the image list view, an image set in the selected state (namely, an image set as a non-display image), and changing the arrangement of images (thumbnail images) in the image list view except for the image (or images) set in the selected state.

As described above, it can be set whether each image managed by the photo viewer application program 202 executed by the CPU 101 should be displayed on the screen. Although the images (files) moved to the non-display folder 57 are not deleted from the computer 1, they are not displayed on the screen normally. The non-display folder 57 can be referred to as an intermediate folder that differs from a folder for deleting files, such as a trash box folder managed by the OS 201 executed by the CPU 101.

Moreover, when, for example, images are newly imported after the above-mentioned image non-display setting is performed, the CPU 101 executing the read module 412 and the display process module 42 can display, on the screen, images left in the display folder 56 (namely, images that are not set as non-display images), and the images newly added to the display folder 56 by the import.

The indexing module 43 includes instructions for generating index data 53 used to search all images 56A and 57A in a predetermined folder (picture library) 55. The indexing module 43 includes instructions for generating, in accordance with storage of a new image (image file) in the picture library 55, index data corresponding to the new image. The indexing module 43 includes instructions for adding the generated index data to the existing index data 53.

The indexing module 43 includes instructions for detecting a person's face image in a processing target image. One image (image file) may include face images, or may include no face images. The indexing module 43 includes instructions for detecting an area (face image area) presumed to be a face image, using, for example, the pixel values of pixels contained in the image. The face image area is an area having typical human face features.

The indexing module 43 includes instructions for computing the feature of the face image (face feature) using the pixel values of pixels contained in the detected face image area. For example, the indexing module 43 may include instructions for computing, as the face feature, a feature indicative of the positional relationship between objects, such as eyes, a nose, a mouth in the face image area, or a feature indicative of colors or shapes of these objects.

The indexing module 43 includes instructions for computing the position and size of a face image on an image as a processing target. The indexing module 43 may also include instructions for computing the degree of smiling of the face image, the angle of the face image with respect to the front, the degree of sharpness of the face image, etc.

The indexing module 43 includes instructions for grouping detected face images into clusters (persons). Face images having similar face features are grouped into the same cluster. Different person IDs are allocated to the clusters.

The indexing module 43 includes instructions for generating index data 53 by using the features of the detected face images.

FIG. 6 shows an example of the index data 53.

The table of FIG. 6 showing the index data 53 includes records corresponding to face images. Each record includes an "image ID" field, a "capturing date and time" field, a "capturing place" field, an "event name" field, and a "face image information" field.

In a record corresponding to a face image, the "image ID" field indicates the identifier (ID) of an image from which the face image was extracted. The "capturing date and time" field indicates the date and time from which the image was obtained by capturing. For the date and time, metadata of the image (image file) is used. The "capturing place" field indicates a place where the image was obtained by photography. For the place, metadata of the image (image file) is used. The "event name" field indicates additional data (comment) given to the image by user input.

The "face image data" field includes the face image extracted from the image. The "face image data" field further includes the feature of the corresponding face image (face feature), the degree of smiling of the face image, the position of the face image, the size of the face image, the person ID corresponding to the face image, etc.

The search module 44 includes instructions for searching images 56A in the display folder 56, based on a date and time, a season, a place, an event, a face (person), and combinations of them. The search module 44 may include instructions for searching images 57A in the non-display folder 57.

The search module 44 includes instructions for searching, for example, images 56A in the display folder 56 for a group of images that include a face image similar to a certain face image (key face image). The key face image is a face image used as a search key in the face search processing. The user can designate, as the key face image, an arbitrary face image included in an arbitrary image.

The search module 44 includes instructions for computing the feature of a face image (face feature) designated as the search key, i.e., a key face image. The search module 44 includes instructions for extracting, from the display folder 56, images each including a face image similar to the key face image, i.e., images each including a face image recognized as the same person as the key face image, using the index data 53. The search module 44 includes instructions for comparing the feature of the key face image with the respective features of face images in the index data 53. The search module 44 includes instructions for extracting, from the display folder 56, images that respectively include a face image having a feature similar to that of the key face image.

The search module 44 may include instructions for extracting, from the display folder 56, images having, for example, smiling degrees not lower than a threshold, using the index data 53.

Referring now to FIGS. 7 to 15, some screen examples displayed by the CPU 101 executing the photo viewer application program 202 (display process module 42) will be described. The CPU 101 executing the photo viewer application program 202 can change content displayed on the screen in accordance with the size or orientation (orientation of landscape or portrait) of the screen of the LCD 20A. More specifically, the CPU 101 executing the photo viewer application program 202 can change the number, size, arrangement, display/non-display of elements on the screen, such as various areas on the screen in which images are displayed, or various operation buttons, in accordance with the size and/or orientation of the screen. Furthermore, the CPU 101 executing the photo viewer application program 202 can select and display either a scroll bar for vertically scrolling images displayed in the form of a list, or a scroll bar for horizontally scrolling these images, in accordance with the size and/or orientation of the screen.

Figure 7:
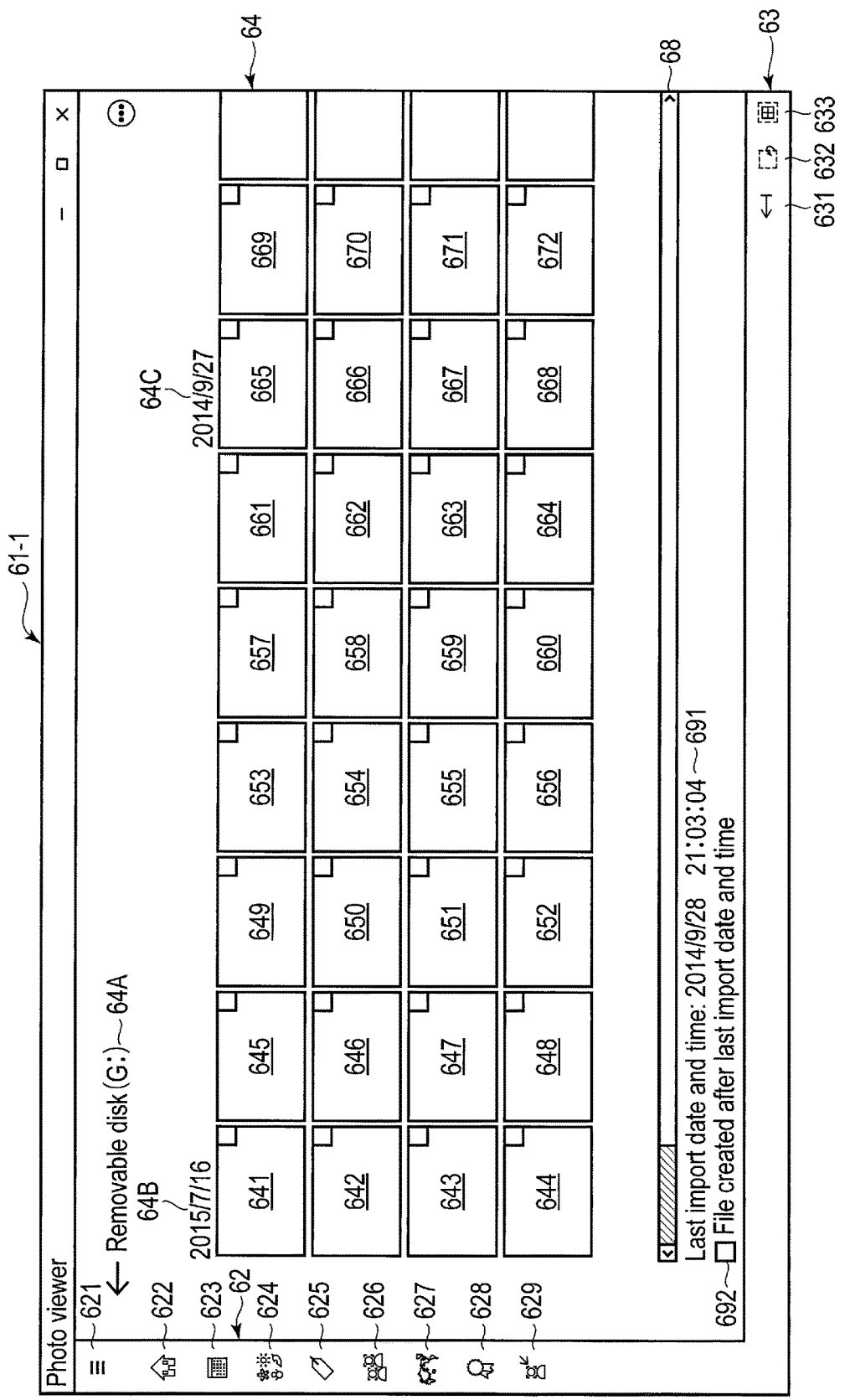
FIG. 7 is a view showing an exemplary import view displayed by the electronic device executing the photo viewer application program.

FIG. 7 shows an import view 61-1 for selecting an image, to be imported into the computer 1, from images stored in the external device 30 (for example, images 31A stored in a nonvolatile memory 31 provided in the external device 30). The import view 61-1 includes a menu button 621, a navigation bar 62, an application bar 63, an image list area 64, and a scroll bar 68.

The menu button 621 is a button for displaying a menu. The menu includes items for instructing display of the navigation bar 62, display of the application bar 63, etc. The navigation bar 62 is displayed on the screen by the user tapping the menu button 621, and then tapping an item, which corresponds to the navigation bar 62, from items in the displayed menu. Further, the application bar 63 is displayed on the screen by the user tapping the menu button 621, and then tapping an item, which corresponds to the application bar 63, from the items in the displayed menu.

Alternatively, the navigation bar 62 may be set to be displayed by performing, for example, rightward swiping from the left end of the screen. Similarly, the application bar 63 may be set to be displayed by performing, for example, upward swiping from the lower end of the screen. If such a swiping operation cannot be used, a function for displaying the navigation bar 62 and the application bar 63 using the menu button 621 may be provided.

The navigation bar 62 includes buttons for instructing switching to various views for browsing images. The navigation bar 62 includes a "timeline" button 622, a "calendar" button 623, a "season" button 624, an "album" button 625, a "face grouping" button 626, a "geographic area" button 627, a "recommendation" button 628, and a "person timeline" button 629.

The "timeline" button 622 is a button for displaying a view in which images of respective capturing dates are arranged chronologically. The "calendar" button 623 is a button for displaying a view in which images are arranged on a calendar. The "season" button 624 is a button for displaying a view in which images are classified in association with respective seasons. The "album" button 625 is a button for displaying a view in which images are arranged in association with respective albums. The "face grouping" button 626 is a button for displaying a view in which images grouped based on faces contained therein are arranged in association with respective persons. The "geographic area" button 627 is a button for displaying a view in which images grouped based on added positional information are arranged in association with geographic areas. The "recommendation" button 628 is a button for displaying a view in which recommended images are arranged. The recommended images include recently browsed images, images set as favorites, images related to today's date, month or season, images of smiling faces, etc. The "person timeline" button 629 is a button for displaying a view in which images of a certain person are arranged in order of time.

The application bar 63 includes an "import" button 631, a "selection release" button 632, and an "all selection" button 633. The "import" button 631 is a button for importing selected photographs into the computer 1. The "selection release" button 632 is a button for collectively setting images set in the selected state to the non-selected state. The "all selection" button 633 is a button for collectively setting selectable images to the selected state.

The image list area 64 is an area for displaying images (thumbnail images) 641 to 672 stored in the external device 30, and selecting, from images 641 to 672, images to be imported to the computer 1. Images 641 to 672 are arranged based on their produced dates and times (for example, in a descending order of the generated dates and times). The image list area 64 includes text strings 64B and 64C that indicate produced dates of the images. In the example of FIG. 7, text string 64B indicates that images 641 to 664 were produced on 2015 Jul. 16, and text string 64C indicates that images 665 to 672 were produced on 2014 Sep. 27. Check boxes indicating whether corresponding images are set in the selected state are provided at the respective upper right ends of images 641 to 672. In the image list area 64, text string 64A indicative of the name of the external device 30 or a corresponding drive name may be displayed.

The scroll bar 68 is a bar for scrolling images displayed in the image list area 64, when the number of images stored in the external device 30 is larger than that of images that can be simultaneously displayed in the area 64.

The image list area 64 further includes a last import date and time 691 and a check box 692. The last import date and time 691 indicates a date and time when a last image is imported from the external device 30 into the computer 1. The check box 692 is a check box for collectively setting, in the selected state, only images (image files) produced after the last import date and time.

When the user has performed an operation for checking the check box 692 (for example, an operation of tapping the check box 692), images included in images 641 to 672 and produced after the last import date and time are set in the selected state. For instance, if the last import date and time is 21:03:04 on Sep. 28, 2014, images 641 to 664 produced on Jul. 16, 2015, i.e., produced after the last import date and time, are set in the selected state, as shown in the import view 61-2 shown in FIG. 8. That is, images 641 to 664 that are not yet imported into the computer 1 are set in the selected state. In contrast, images 665 to 672 produced on Sep. 27, 2014, i.e., produced before the last import date and time, are set in the non-selected state. That is, images 665 to 672 that are already imported in the computer 1 or are already judged to be unnecessary by the user are set in the non-selected state.

Elements indicative of the selected state are drawn on images 641 to 664 of the selected state. The elements indicative of the selected state are, for example, check marks in the check boxes on images 641 to 664. In the check boxes on images 665 to 672 set in the non-selected state, the elements (check marks) indicative of the selected state are not drawn.

Since the images, which are produced after the last date and time of import from the external device 30, are set in the selected state simply by checking the check box 692 as described above, images 641 to 664 can be imported into the computer 1 by further performing an operation to instruct start of import (for example, by tapping the import button 631) by the user. Further, the user can easily detect that images 641 to 664 set in the selected state are not yet imported into the computer 1, and can also set, in the non-selected state by tapping, those of images 641 to 664 that are not necessary.

When an operation of instructing start of import is performed, data (image files) corresponding to images 641 to 664 of the selected state is received from the external device 30, and is stored in, for example, the display folder 56 of the nonvolatile memory 104. The display folder 56 is a folder newly produced in the picture library 55 of the nonvolatile memory 104 in accordance with, for example, the operation of instructing start of import.

Figure 8:
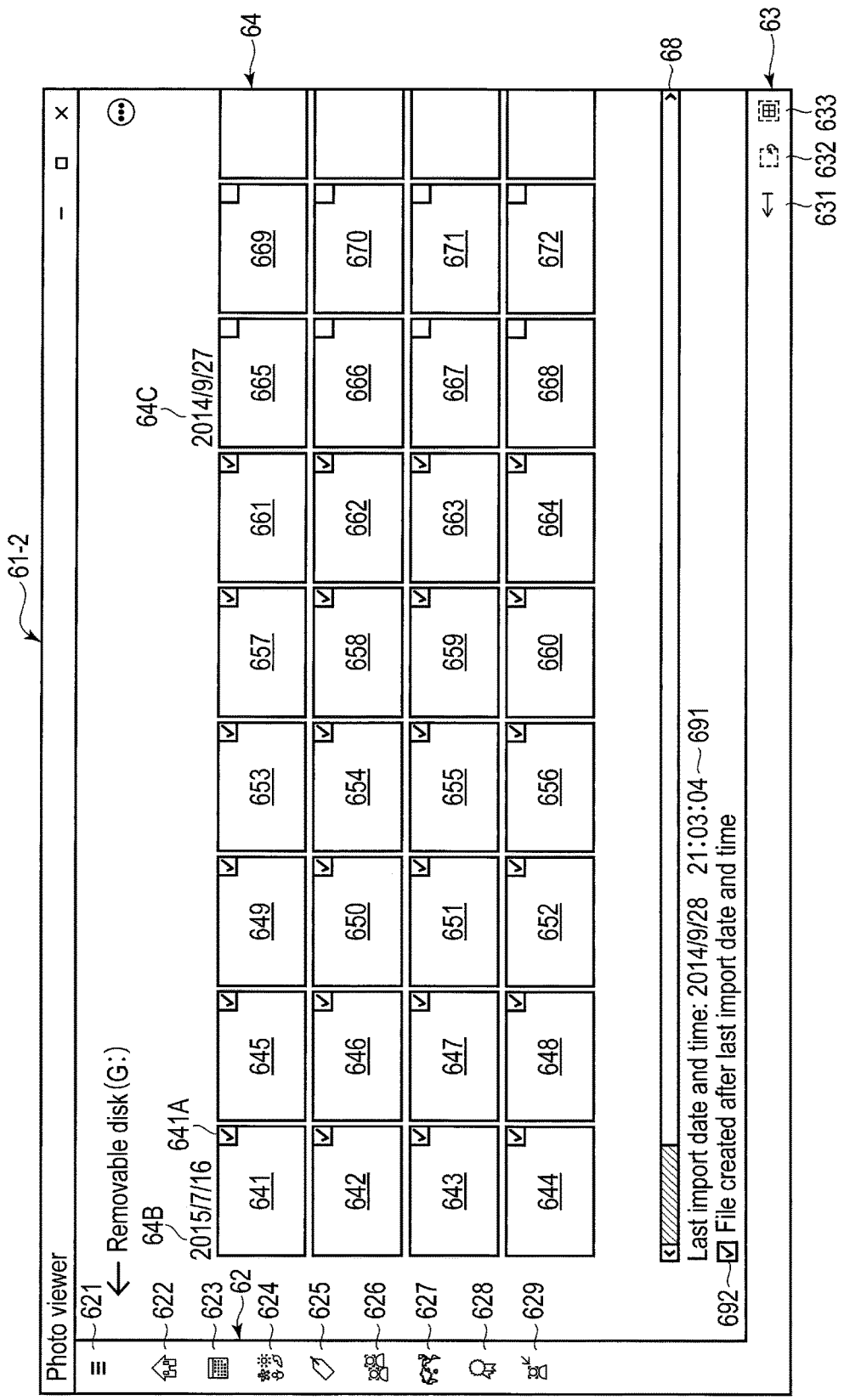
FIG. 8 is a view showing an exemplary import view that is displayed by the electronic device executing the photo viewer application program, and includes selected images obtained after a last import date and time.
Figure 9:
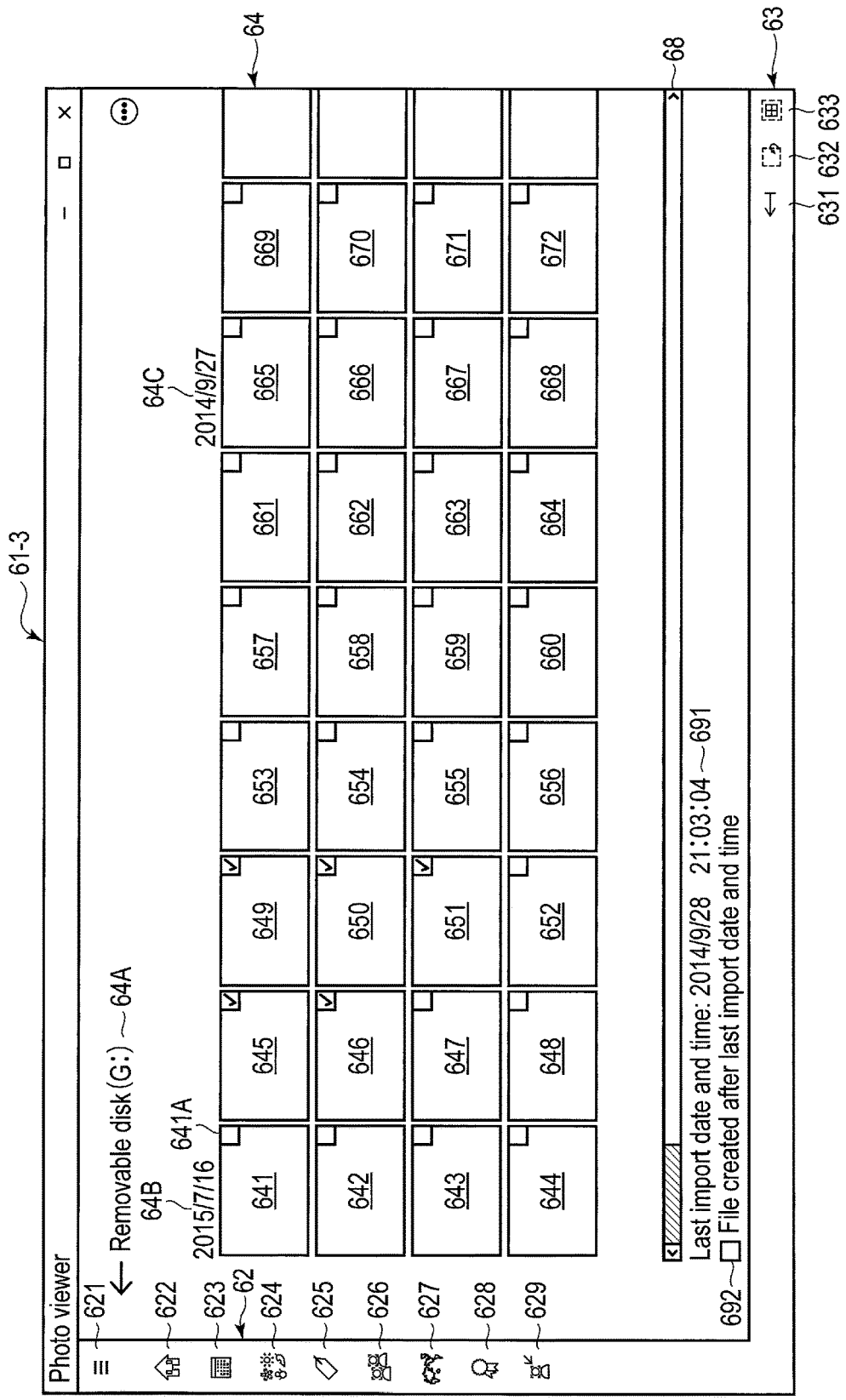
FIG. 9 is a view for explaining image selection by a user on the import view of FIG. 7 or FIG. 8.

The user can also freely select images to be imported into the computer 1, as is shown in import view 61-3 of FIG. 9. The user sets images 645, 646, 649, 650 and 651 to the selected state by performing, for example, the following operations:

operations of tapping images 645 and 646, 649, 650 and 651 in the non-selected state when import view 61-1 of FIG. 7 is displayed; and operations of tapping images 641 to 644, 647, 648 and 652 to 664 in the selected state when the import view 61-2 of FIG. 8 is displayed.

Further, when an operation of instructing start of import is performed on import view 61-3 of FIG. 9, data corresponding to images 645, 646, 649, 650 and 651 of the selected state is received and stored in, for example, the display folder 56 of the nonvolatile memory 104.

Figure 10:
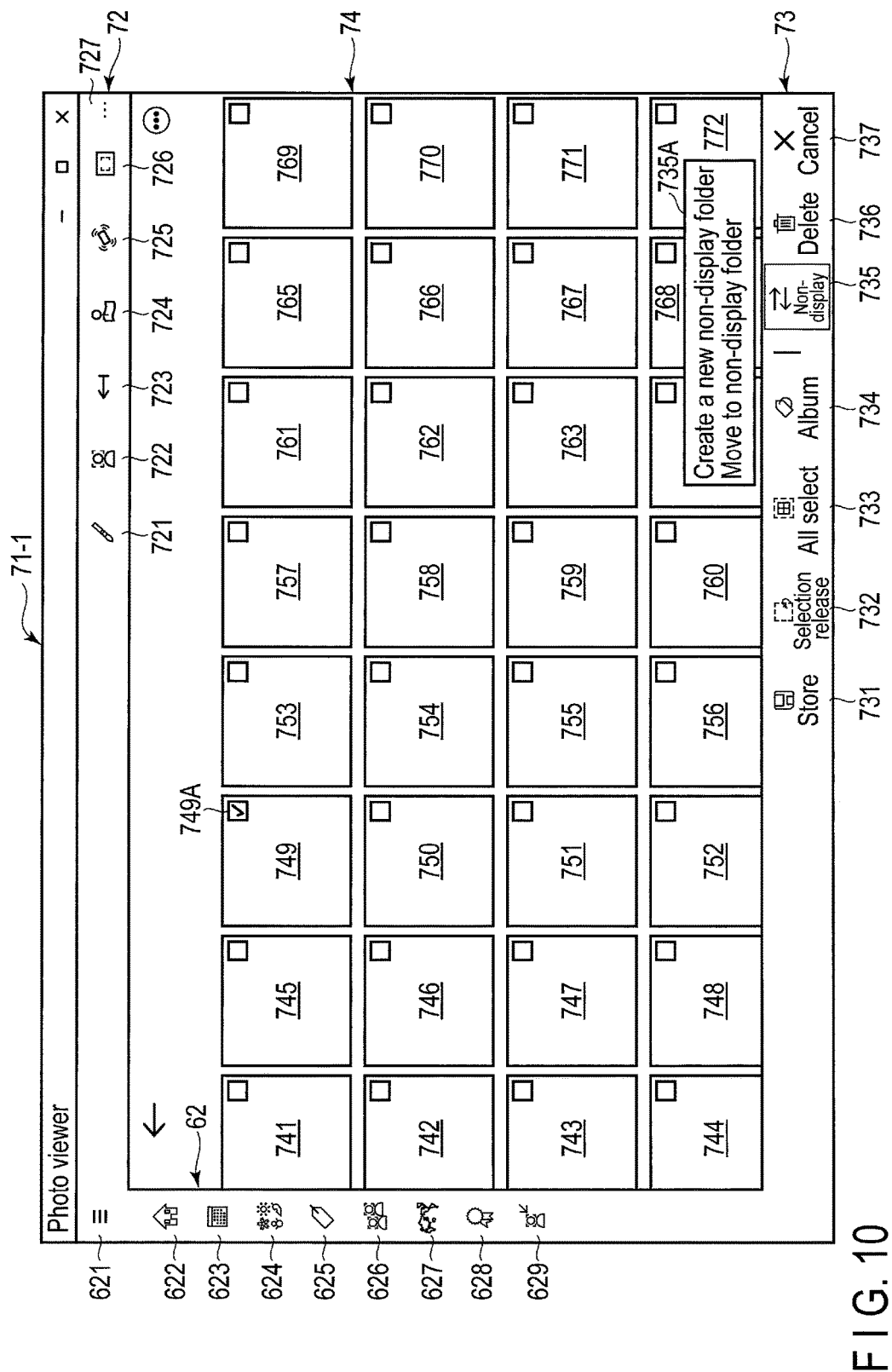
FIG. 10 is a view for explaining non-display setting for images on an image list view displayed by the electronic device executing the photo viewer application program.

Referring then to FIG. 10, a description will be given of an example in which an image is set in the non-selected state on an image list view 71-1 of images stored in the computer 1. The image list view 71-1 includes a menu button 621, a navigation bar 62, application bars 72 and 73, and an image list area 74.

The menu button 621 is a button for displaying a menu. The menu includes items for instructing display of the navigation bar 62, display of application bars 72 and 73, etc. The navigation bar 62 is displayed on the screen by the user tapping the menu button 621, and then tapping an item, which corresponds to the navigation bar 62, from items in the displayed menu. Further, application bars 72 and 73 are displayed on the screen by the user tapping the menu button 621, and then tapping items, which correspond to application bars 72 and 73, from the items in the displayed menu.

Alternatively, the navigation bar 62 may be set to be displayed by performing, for example, rightward swiping from the left end of the screen. Similarly, application bar 72 may be set to be displayed by performing, for example, downward swiping from the upper end of the screen. Yet similarly, application bar 73 may be set to be displayed by performing, for example, upward swiping from the lower end of the screen. If such a swiping operation cannot be used, a function for displaying the navigation bar 62 and application bars 72 and 73 using the menu button 621 may be provided.

A configuration of the navigation bar 62 is the same as it described above referring to FIG. 7.

Application bar 72 includes an "edit" button 721, an "image search" button 722, an "import" button 723, a "map" button 724, a "shake" button 725, a "hold up" button 726, a "setting" button 727, etc. The "edit" button 721 is a button for switching to a view for creation of a collage or an album using images. The "image search" button 722 is a button for switching to an image search view. The "import" button 723 is a button for switching to an import view. The "map" button 724 is a button for switching to a view in which an image is associated with a map. The "shake" button 725 is a button for, in response to shaking of the computer 1, switching to a view in which a recommended image or an associated image is displayed. The "hold up" button 726 is a button for, in response to capturing a printed photograph or a photograph displayed on a digital photo-frame, switching to a view in which an image is associated with the photograph. The "setting" button 727 is a button for displaying menus for various types of setting.

Application bar 73 includes a "store" button 731, a "selection release" button 732, an "all select" button 733, an "album" button 734, a "non-display" button 735, a "delete" button 736, and a "cancel" button 737.

The "store" button 731 is a button for copying an image (or folder) set in the selected state to a specified external device (for example, external storage). The "selection release" button 732 is a button for collectively setting images set in the selected state to the non-selected state. The "all select" button 733 is a button for collectively setting all selectable images to the selected state. The "album" button 734 is a button for displaying a menu required for editing an album. The "non-display" button 735 is a button for setting an image set in the selected state as a non-display image. The "delete" button 736 is a button for deleting an image set in the selected state (for example, moving it to a trash box folder set by the OS 201).

The image list area 74 is an area for displaying images (thumbnail images) stored in the display folder 56 of the nonvolatile memory 104. Images 741 to 772 are arranged based on their produced dates and times (for example, in a descending order of the dates and times).

The user selects image 749, which is to be set in the non-display state, from images 741 to 772, for example, by tapping image 749. In accordance with this operation, an element (in this case, a check mark), which indicates the selected state, is drawn in a check box 749A on selected image 749.

If the user then performs an operation of tapping the non-display button 735, a menu 735A is displayed. The menu 735A includes an item "create a new non-display folder," and an item "move to a non-display folder." If the user further taps the item "create a new non-display folder," a non-display folder 57 for storing images that are not display targets is newly created in the picture library 55.

Further, if the user performs an operation of tapping the item "move to a non-display folder," image 749 in the selected state is set as a non-display target. That is, the file (data) of image 749 is moved from the display folder 56 to the non-display folder 57. Image 749 set as the non-display target is deleted from the image list area 74, and an image list in which remaining images 741 to 748 and 750 to 772 are arranged is displayed on the screen.

Thus, in this embodiment, an image as a display target is stored in the display folder 56, and an image not as a display target is stored in the non-display folder 57, instead of imparting an attribute of display or non-display to each image. Since this structure enables an image as a display target or a list of such images to be displayed only by accessing the display folder 56, unnecessary access to images that are not display targets can be avoided. Therefore, an image as a display target or a list of such images can be displayed more quickly than in a case where a folder including both images of a "display" attribute and images of a "non-display" attribute is accessed and whether each of the images is of the "display" attribute or of the "non-display" attribute is determined.

Further, if the "cancel" button 737 is tapped when the menu 735A is displayed, the operation of tapping the "non-display" button 735 is canceled, and hence the menu 735A is deleted from the screen. Moreover, in the above-described example, although single image 749 is set in the selected state in the image list area 74, plural images may be set in the selected state. In this case, the plural images set in the selected state can be collectively moved to the non-display folder 57.

A mode in which even images set as non-display images are also displayed in the image list view 71-1 may be employed. In this case, both the images stored in the display folder 56 and the images stored in the non-display folder 57 can be displayed in the image list area 74. If needed, the user can select this mode, thereby browsing or operating the images in the non-display folder 57.

Referring then to FIG. 11, a description will be given of an example in which non-display of images is set folder by folder on an image list view 71-2 including areas for each of the folders stored in the computer 1. Assume here that the nonvolatile memory 104 (picture library 55) stores display folders 78A to 78F corresponding to the respective dates when images are produced. Respective names (for example, "2015/9/28") based on the dates of display folders 78A to 78F are allocated to them. The image list view 71-2 includes a menu button 621, a navigation bar 62, application bars 72 and 73, and image list areas 78 for each of the folders.

The menu button 621, the navigation bar 62, and application bars 72 and 73 are the same as those described above.

The image list areas 78 are areas for displaying, folder by folder, images 781 to 796 stored in display folders 78A to 78F. Images (a group of images) in each of display folders 78A to 78F are arranged based on the dates of production (for example, in a descending order of the dates of production).

The user selects folder 78A, which is to be set in the non-display folder, from display folders 78A to 78F by, for example, tapping display folder 78A. Similarly, the user selects folders 78B and 78C to be set in the non-display folder by tapping display folders 78B and 78C. In accordance with these operations, elements indicative of the selected state (in this case, check boxes with check marks) are drawn on selected folders 78A to 78C.

If the user subsequently performs an operation of tapping the non-display button 735, folders 78A, 78B and 78C in the selected state are changed from the "display" attribute to the "non-display" attribute. Images 781 to 791 in folders 78A to 78C, which are set to the "non-display" attribute, are deleted from the image list area 78, and the image list area 78, where remaining images 792 to 796 are arranged, is displayed on the screen.

As described above, in the embodiment, a display folder is changed to a non-display folder by changing the attribute of the display folder from "display" to "non-display." This enables the images in the display folder to be collectively set to images that are not display targets. In contrast, by changing, from "non-display" to "display," the attribute of a non-display folder storing images that are not display targets, the non-display folder can be changed to a display folder. This enables the images in the non-display folder to be collectively set to images that are display targets. Thus, display/non-display of images can be easily managed folder by folder.

Figure 12:
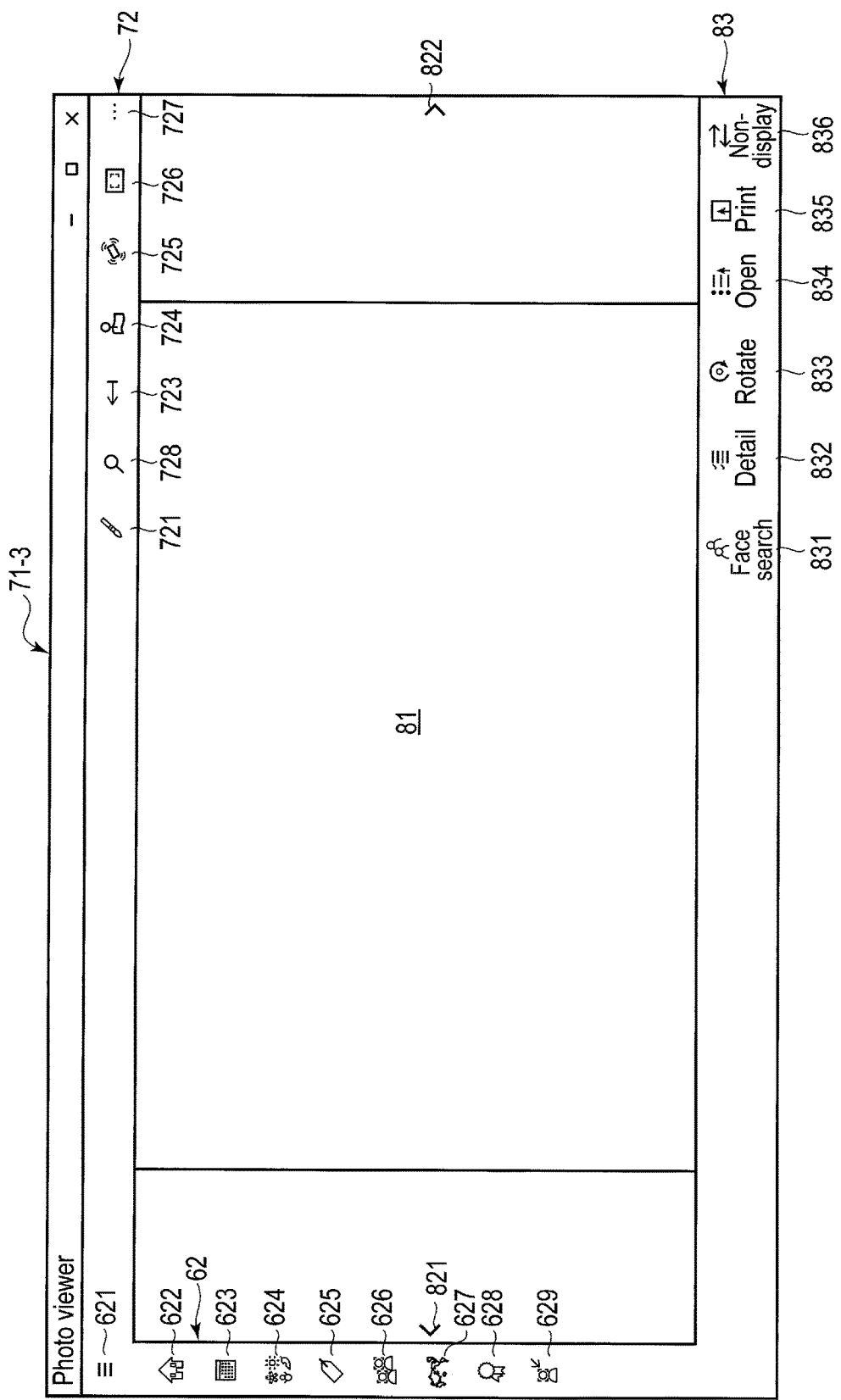
FIG. 12 is a view showing an exemplary selected-image view associated with an image selected in the image list view of FIG. 10 or FIG. 11.
Figure 13:
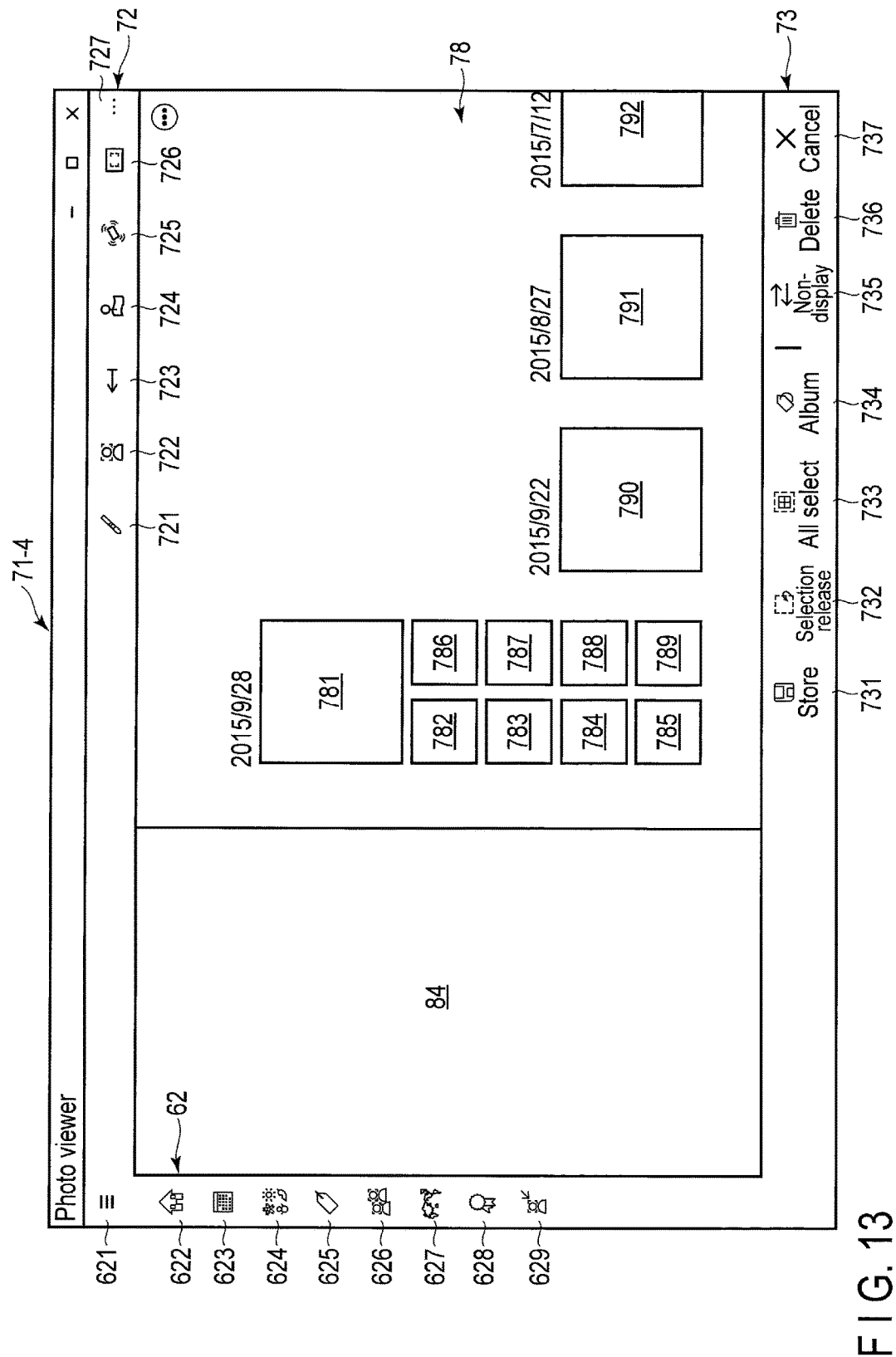
FIG. 13 is a view showing an exemplary image list view for respective folders, which is displayed by the electronic device executing the photo viewer application program and includes a recommended-image area.

FIG. 12 shows a selected-image view 71-3, in which one image selected in the image list view 71-1 shown in FIG. 10 or in the image list view 71-2 shown in FIG. 11 is displayed at a large scale. The selected-image view 71-3 includes a menu button 621, a navigation bar 62, application bars 72 and 83, an image area 81, and image switch buttons 821 and 822.

The menu button 621, the navigation bar 62 and the application bar 72 are the same as described above. The application bar 83 includes a "face search" button 831, a "detail" button 832, a "rotate" button 833, an "open" button 834, a "print" button 835, and a "non-display" button 836. The "face search" button 831 is a button for switching to a search view based on a face image. The "detail" button 832 is a button for displaying detailed information of an image. The "rotate" button 833 is a button for rotating an image. The "open" button 834 is a button for switching to a view for editing an image. The "print" button 835 is a button for switching to a view for printing an image. The "non-display" button 836 is a button for setting non-display of an image.

The image area 81 is an area for displaying one image selected in the image list view 71-1 or 71-2. In the image area 81, an image, which is displayed at a small scale as a thumbnail image in the image list view 71-1 or 71-2, is displayed at a large scale. An image displayed in the image area 81 can be switched to, for example, an image before or after in the time domain in accordance with an operation of tapping switch buttons 821 and 822 arranged on the left and right sides of the image area 81, respectively.

The image list view 71-1 shown in FIG. 10 or the image list view 71-2 shown in FIG. 11 may include a recommended-image area. For instance, like image list view 71-4 shown in FIG. 13, the size of the image list area 78 is reduced, and a recommended image is displayed on an area 84 obtained by the reduction. The recommended image is, for example, a recently browsed image, an image set as a favorite image, an image related to today's date, month or season, a smiling-face image, etc.

As described above, the CPU 101 executing the photo viewer application program 202 can change the content displayed on the screen (view) in accordance with the size or orientation of the screen. FIGS. 7 to 13 show various views displayed on a landscape screen. FIGS. 14 to 17 show various views displayed on a portrait screen, which will hereinafter be described.

Firstly, FIG. 14 shows an image list view 91-1 displayed on the portrait screen. The image list view 91-1 includes a menu button 621, application bars 72 and 73, an image list area 92, and a scroll bar 94. In the image list view 91-1 on the portrait screen, the image list area 92 is set in accordance with the size and orientation of the screen. Images (thumbnail images) 921 to 932 are arranged in the image list area 92. Images 921 to 932 in the image list area 92 can be horizontally scrolled using the scroll bar 94.

While in landscape image list view 71-1 shown in FIG. 10, the navigation bar 62 is located at the left end of the screen, in the portrait image list view 91-1, the navigation bar 62 is not provided. This is because it is necessary to maximize the number of images (thumbnail images) arranged horizontally in the image list area 92 on the portrait screen of a small width.

Figure 15:
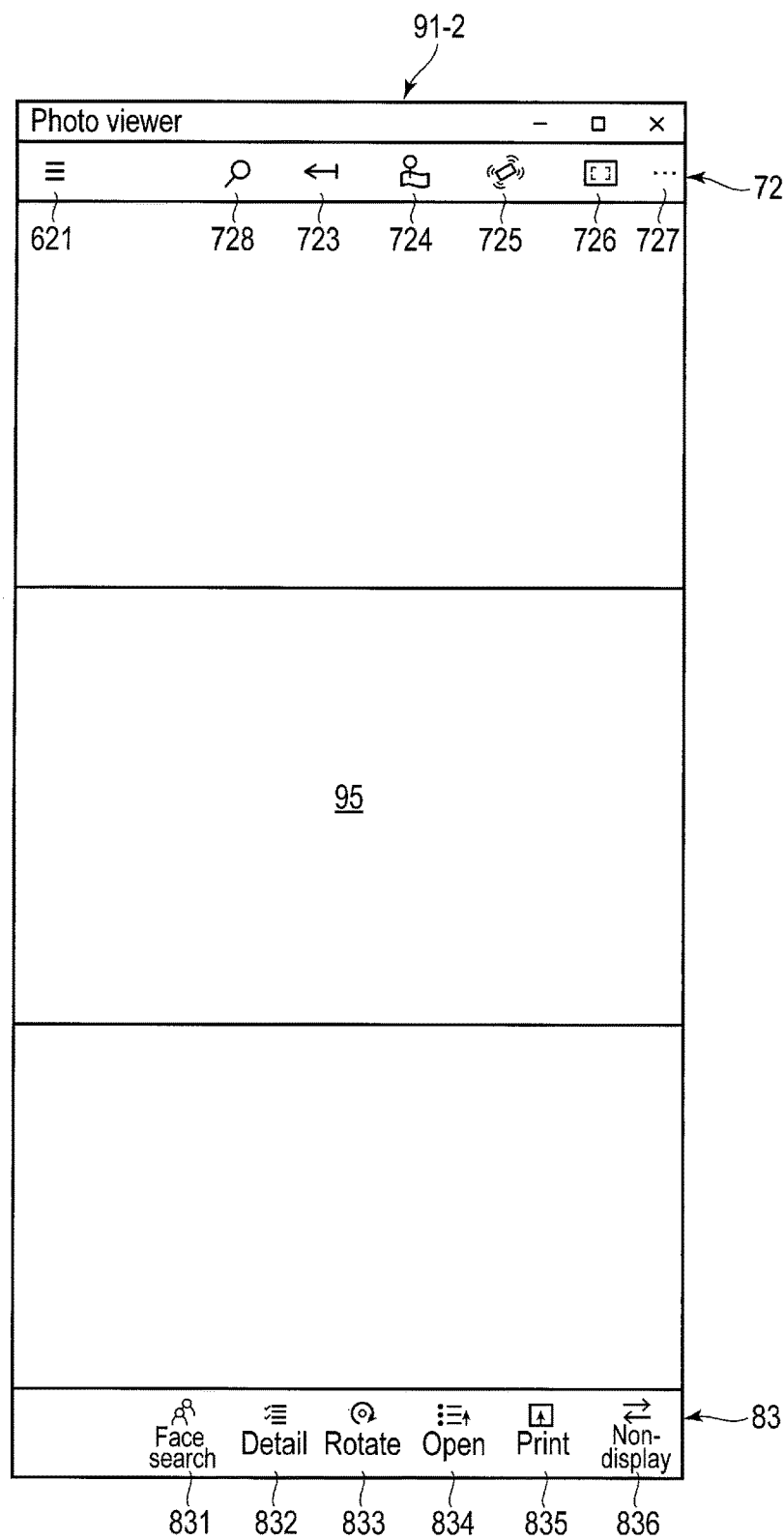
FIG. 15 is a view showing an exemplary selected-image view associated with one image selected in the image list view of FIG. 14.

Moreover, FIG. 15 shows a selected-image view 91-2 in which one image selected in the image list view 91-1 is displayed at a large scale. The selected-image view 91-2 includes a menu button 621, application bars 72 and 83, and an image area 95.

In landscape selected-image view 71-3 shown in FIG. 12, the navigation bar 62 is located at the left end of the screen, and image switch buttons 821 and 822 are arranged on the left and right sides of the image area 81, respectively. In contrast, in the portrait selected-image view 91-2, none of the navigation bar 62 and the switch buttons 821 and 822 is provided. This is because it is necessary to maximize the size of one image displayed on the image area 95 on the portrait screen of a small width.

Figure 16:
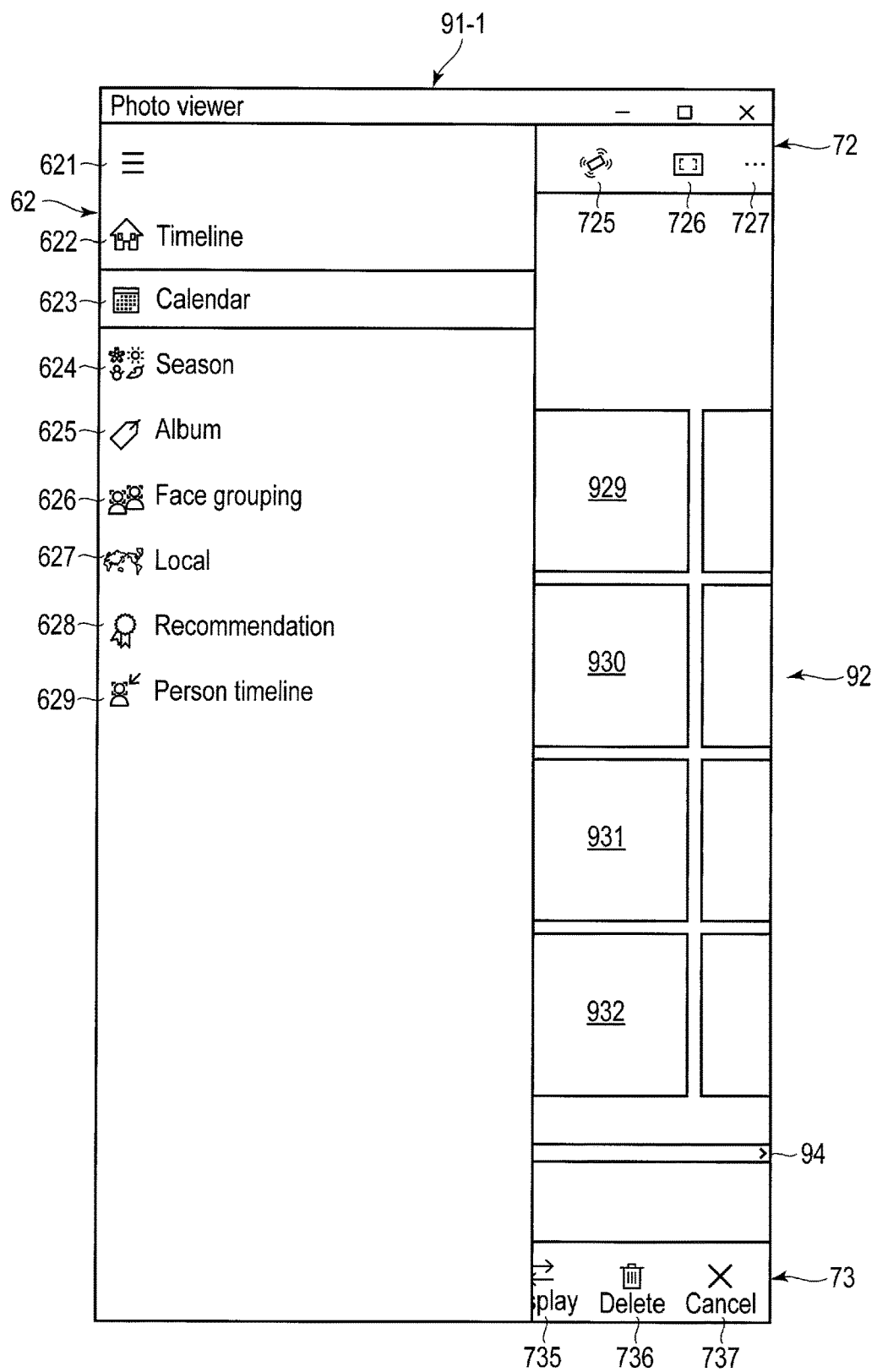
FIG. 16 is a view showing an exemplary navigation bar displayed when a menu button in the image list view of FIG. 14 is depressed.

In addition, in the portrait image list view 91-1, the navigation bar 62 can be displayed in accordance with an operation of tapping the menu button 621, as is shown in FIG. 16.

Figure 17:
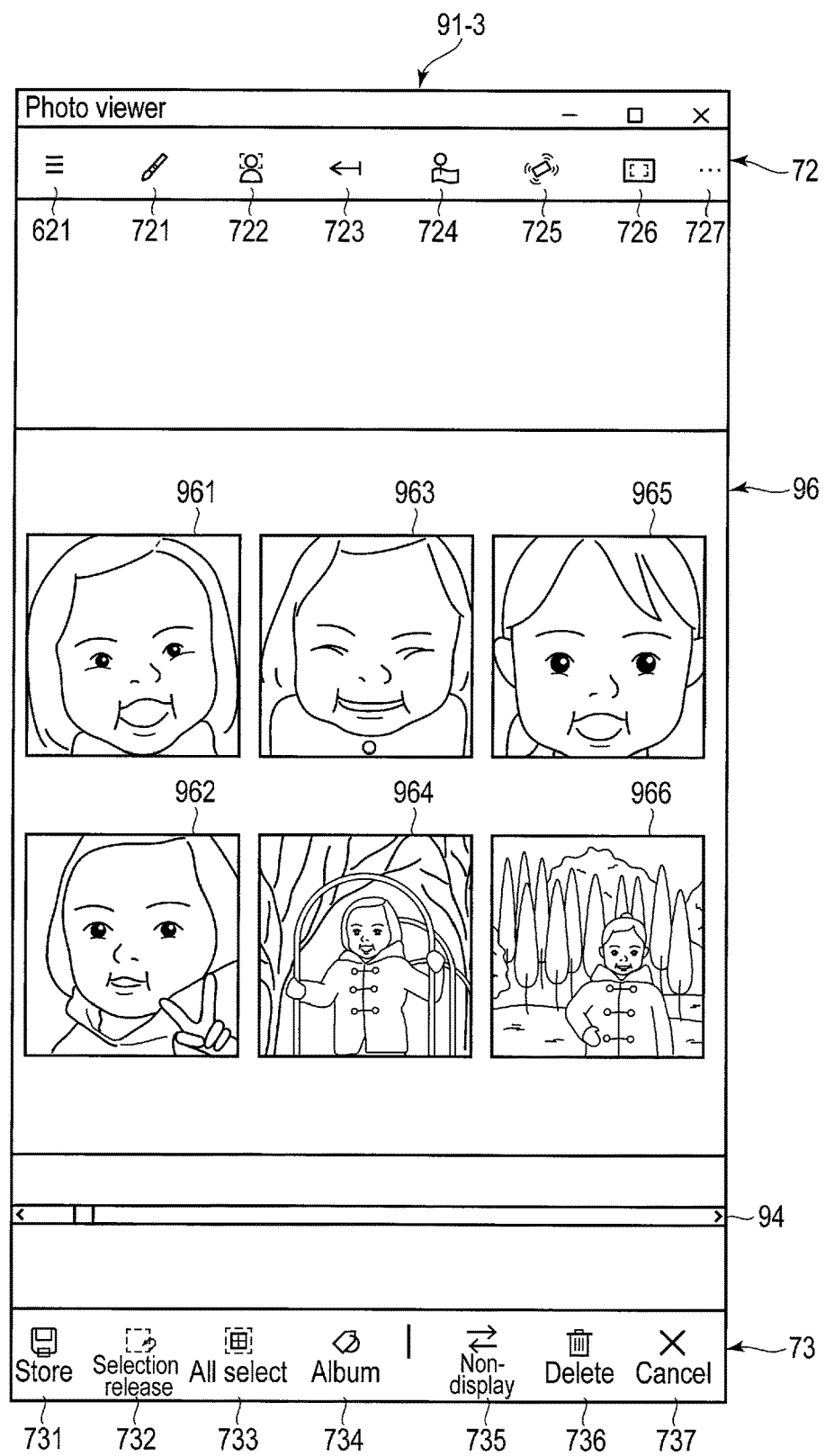
FIG. 17 is a view showing an exemplary recommended-image view (smiling-face view) displayed when a recommendation button in the image list view of FIG. 16 is depressed.

FIG. 17 shows a recommended-image view (smiling-face view) 91-3 displayed in accordance with an operation of tapping a "recommendation" button 628 on the navigation bar 62. The recommended-image view 91-3 includes a menu button 621, application bars 72 and 73, an image list area 96, and a scroll bar 94.

In the image list area 96, for example, smiling-face images 961 to 966 are arranged as recommended images. Smiling-face images 961 to 966 are images whose degree of smiling in the index data 53 is not less than a threshold. In the image list area 96, a recently browsed image, an image set as a favorite image, an image related to today's date, month or season, etc.

Figure 18:
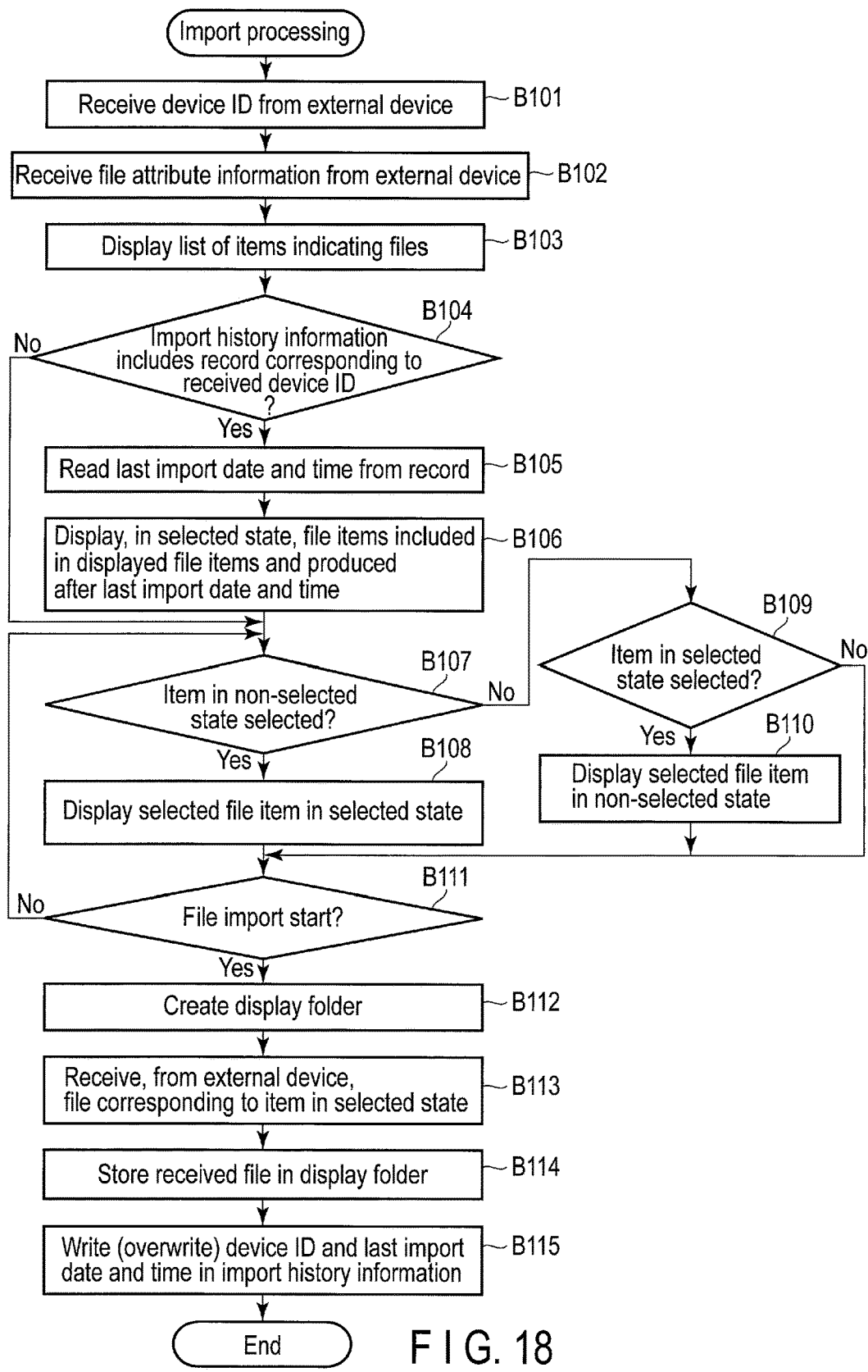
FIG. 18 is a flowchart showing the procedure of import processing.

Referring then to the flowchart of FIG. 18, a description will be given of an example of the procedure of import processing for importing a file from the external device 30.

The CPU 101 of the computer 10 receives device ID from a connected external device 30 (block B101), and receives attribute information of files stored in the external device 30 (block B102). The file attribute information includes, for example, a file name, an updated date, and a file format (extension). Subsequently, the CPU 101 displays, on the screen, a list including items (for example, text, thumbnail images, icons) that indicate files stored in the external device 30, using the received file attribute information (block B103).

Further, the CPU 101 determines whether the import history information 51 includes a record corresponding to the device ID received in block B101 (block B104). If the import history information 51 includes the record corresponding to the received device ID (Yes in block B104), the CPU 101 reads the value of the "last import date and time" from the record (block B105). After that, the CPU 101 displays, in a selected state, items that are included in the file items displayed on the screen, and correspond to files produced (updated) after the read last import date and time (block B106). The CPU 101 draws, for example, check boxes with check marks for the items of the files produced (updated) after the last import date and time.

In contrast, if the import history information 51 does not include a record corresponding to the received device ID (No in block B104), the procedure of blocks B105 and B106 are skipped.

Subsequently, the CPU 101 determines whether an item of the displayed file items, which is in the non-selected state, has been selected (block B107). If the item displayed in the non-selected state has been tapped, the CPU 101 determines that the item in the non-selected state has been selected. If the item in the non-selected state has been selected (Yes in block B107), the CPU 101 displays the selected item in the selected state (that is, the state of the selected item is changed to the selected state) (block B108).

If the item in the non-selected state is not selected (No in block B107), the CPU 101 determines whether an item of the displayed file items, which is in the selected state, has been selected (block B109). If the item displayed in the selected state has been tapped, the CPU 101 determines that the item in the selected state has been selected. If the item in the selected state has been selected (Yes in block B109), the CPU 101 displays the selected item in the non-selected state (for example, a check mark in a check box corresponding to this item is erased) (block B110). If the item in the selected state is not selected (No in block B109), the procedure of block B110 is skipped.

Subsequently, the CPU 101 determines whether file import should be started (block B111). If, for example, a button for instructing file import has been tapped, the CPU 101 determines to start file import. If file import is not started (No in block B111), processing responding to an operation of selecting a file to be imported is continued by returning to block B107.

If file import should be started (Yes in block B111), the CPU 101 creates a new display folder 56 for a file to be imported (block B112). The display folder 56 is created in, for example, the picture library 55, and a name (for example, "2015-09-25") based on the date of the creation is attached thereto.

After that, the CPU 101 receives, from the external device 30, a file corresponding to the selected-state item on the screen (block B113), and causes the nonvolatile memory 104 to store it in the created display folder 56 (block B114). When all files corresponding to items in the selected state have been imported, the CPU 101 writes, to the import history information 51, a record that includes the device ID and the last import date and time (block B115). More specifically, if the import history information 51 includes a record corresponding to the device ID of the connected external device 30, the CPU 101 overwrites the "last import date and time" in the record with the date and time when the import has been completed. Further, if the import history information 51 does not include the record corresponding to the device ID of the connected external device 30, the CPU 101 adds, to the import history information 51, a new record including the device ID and the last import date and time.

FIG. 19 shows an example of the procedure of display control processing for controlling a display/non-display of an image (photograph).

First, the CPU 101 of the computer 10 reads images from the display folder 56 (block B201). The display folder 56 is, for example, at least one folder (directory) associated with the photo viewer application program 202. The CPU 101 reads images from a folder 56, which is set as a "display" attribute folder, from among the at least one folder indicated by the folder attribute information 52. The CPU 101 displays, on the screen, an image list view that includes thumbnail images corresponding to the read images (block B202).

Subsequently, the CPU 101 determines whether an image currently displayed has been selected (block B203). For example, if the image has been tapped, the CPU 101 determines that it has been selected. This selected image is an image that the user wants to set as a non-display image.

If the image has been selected (Yes in block B203), the CPU 101 displays the selected image in the selected state (block B204). The image displayed in the selected state is an image on which, for example, a check box with a check mark has been drawn. An image in the selected state and an image in the non-selected state may be displayed identifiably, for example, drawing frame lines, or changing colors or brightness, as well as existence/non-existence of the check mark in the check box.

If no image is selected (No in block B203), the procedure of block B204 is skipped. In addition, if the image in the selected state is again selected (again tapped), the CPU 101 returns the image to the non-selected state (for example, a frame line surrounding the image is deleted).

Next, the CPU 101 determines whether image selection has been finished (block B205). The CPU 101 determines that image selection has been finished, when, for example, a button for instructing image non-display setting has been tapped. If the image selection is not yet finished (No in block B205), selection of an image to be set as a non-display image is continued by returning to block B203.

If the image selection is finished (Yes in block B205), the CPU 101 determines whether the non-display folder 57 for storing an image set as a non-display image is set (block B206). Using, for example, the folder attribute information 52, the CPU 101 determines whether there is a "non-display" attribute folder. If no non-display folder is set (No in block B206), the CPU 101 sets a new non-display folder 57 (block B207). The CPU 101 may set an existing folder as the non-display folder 57, and may create a new folder to be set as a non-display folder 57. The CPU 101 adds, to the folder attribute information 52, a record corresponding to the newly set non-display folder 57. If the non-display folder 57 is set (Yes in block B206), the procedure of block B207 is skipped. However, even when the non-display folder 57 is set, the CPU 101 may create (set) a new non-display folder 57 in accordance with an operation of the user.

The CPU 101 moves an image, which is currently displayed in the selected state on the screen, from the display folder 56 to the non-display folder 57 (block B208).

After that, the CPU 101 reads images from the display folder 56 obtained after the image movement (block B209). The CPU 101 displays, on the screen, an image list view that includes thumbnail images corresponding to the read images (that is, the currently displayed image list view is updated using the newly read images) (block B210). Alternatively, the CPU 101 may update the image list view without reading images from the display folder 56, that is, by deleting, from the screen, images set as non-display images, and changing the arrangement of images (thumbnail images) in the image list view except for the images set as the non-display images.

As described above, in the embodiment, the CPU 101 and the graphics controller 106 display, on the screen of the display 20A, first images stored in the display folder (first directory) 56 in the nonvolatile memory (storage medium) 104. The CPU 101 moves at least one second image of the first images, which is selected by a user, from the display folder 56 to the non-display folder (second directory) 57 in the nonvolatile memory 104. Further, after the at least one second image is moved to the non-display folder 57, the CPU 101 and the graphics controller 106 display at least one third image on the screen, the at least one third image obtained by excluding the at least one second image from the first images.

As a result, images as display targets or a list thereof can be displayed on the screen without considering the display/non-display attribute of each image, and simply by accessing the display folder 56. This enables display/non-display of a large number of images without degrading convenience for the user.

Moreover, the CPU 101 and the graphics controller 106 display, on the screen, items indicative of fourth images stored in the external device 30. For an item of the displayed items, which is indicative of an image produced after a date and time when an image is last imported from the external device 30 to the computer 1, the CPU 101 and the graphics controller 106 draw an element indicative of a selected state.

This structure enables the user to easily detect that an image in the selected state has not yet been imported into the computer 1. As a result, an image is prevented from being imported in duplicate, and user effort for image selection can be reduced.

Each of various functions described in the embodiment may be realized by a circuit (a processing circuit). The processing circuit is, for example, a programmable processor, such as a central processing unit (CPU). This processor executes each of the described functions by executing a computer program (command group) stored in a memory.

The processor may be a microprocessor including an electrical circuit. The processing circuit may be a digital signal processor (DSP), an application-specific integrated circuit (ASIC), a microcontroller, a controller, or other electric circuit components. Each of the components other than the CPU described in the embodiment may also be realized by a processing circuit.

Moreover, since each of various types of processing in the embodiment can be realized by a computer program, the same advantage as that obtained in the embodiment can be easily obtained simply by installing the computer program in the computer through a computer-readable medium that stores the program, and executing the same.

The various modules of the systems described herein can be implemented as software applications, hardware and/or software modules, or components on one or more computers, such as servers. While the various modules are illustrated separately, they may share some or all of the same underlying logic or code.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An electronic device comprising:
    a nonvolatile memory that comprises a display folder storing images and a non-display folder, the nonvolatile memory further stores a table of folder attribute information that comprises a display attribute or a non-display attribute for each image folder; and
    a hardware processor configured to:
        read first images storing in the display folder;
        display first thumbnail images of the first images and a move button on a screen of a display, wherein the move button is used for outputting an instruction for moving at least one second image to the non-display folder, the at least one second image corresponds to at least one second thumbnail image, and the at least one second thumbnail image is selected from the first thumbnail images,
        set, when the at least one second thumbnail image is selected from the first thumbnail images by a user operation, the at least one second thumbnail image in a selected state, wherein the at least one second image corresponding to the at least one second thumbnail image is to be moved to the non-display folder,
        move, when the at least one second thumbnail image is set in the selected state and the move button is tapped, the at least one second image to the non-display folder, and
        display at least one third thumbnail image on the screen without displaying the at least one second thumbnail image on the screen after the at least one second image is moved to the non-display folder, the at least one third thumbnail image being obtained by excluding the at least one second thumbnail image from the first thumbnail images,
    wherein the hardware processor is further configured to:
        update the table of folder attribute information by setting the non-display attribute for the non-display folder to which the at least one second image is moved; and
        read images from an image folder to which the display attribute is set in the table of folder attribute information.

2. The electronic device of claim 1, wherein
    the nonvolatile memory further stores an import history table that comprises records for external devices, each of the records comprising a device identification data (ID) and a last import date and time, and
    the hardware processor is further configured to:
        receive, when images stored in a first external device are to be imported, a first device ID of the first external device,
        read, when the import history table comprises a first record comprising the first device ID, a first last import date and time from the first record,
        read fourth thumbnail images from the first external device, the fourth thumbnail images corresponding to fourth images that are stored in the first electronic device and are produced after the first last import date and time, and
    display, on the screen, the fourth thumbnail images that are set in the selected state.

3. The electronic device of claim 2, wherein
    the hardware processor is further configured to display the fourth thumbnail images in a view area, and
    the view area comprises information indicative of the first last import date and time of the first external device and a check box for specifying images produced after the first last import date and time.

4. The electronic device of claim 3, wherein the hardware processor is configured to set, when the check box is checked, the fourth thumbnail images in the selected state, the fourth thumbnail images corresponding to the fourth images that are produced after the first last import date and time.

5. The electronic device of claim 2, wherein the hardware processor is further configured to overwrite the first last import date and time in the first record with an import date and time when importing the at least one fifth image is completed.

6. The electronic device of claim 2, wherein the hardware processor is further configured to add, when the import history table does not comprise a record comprising the first device ID, a record that comprises the first device ID and a last import date and time to the import history table.

7. The electronic apparatus of claim 2, wherein
    the hardware processor is configured to set each of the fourth thumbnail images in the selected state or in a non-selected state in accordance with a selection operation by the user.

8. The electronic device of claim 7, wherein the hardware processor is further configured to
    import, from the first external device to the display folder in the nonvolatile memory, at least one fifth image corresponding to at least one fifth thumbnail image of the fourth thumbnail images, the at least one fifth thumbnail image being in the selected state.

9. The electronic apparatus of claim 1 further comprising the display.

10. A method executed by an electronic device that comprises a nonvolatile memory and a controller, the nonvolatile memory comprising a display folder storing images and a non-display folder and storing a table of folder attribute information that comprises a display attribute or a non-display attribute for each image folder, the method comprising:
    reading first images storing in the display folder;
    displaying first thumbnail images of the first images and a move button, wherein the move button is used for outputting an instruction for moving at least one second image to the non-display folder, the at least one second image corresponds to at least one second thumbnail image, and the at least one second thumbnail image is selected from the first thumbnail images;
    setting, when the at least one second thumbnail image is selected from the first thumbnail images by a user operation, the at least one second thumbnail image in a selected state, wherein the at least one second image corresponding to the at least one second thumbnail image is to be moved to the non-display folder;
    moving, when the at least one second thumbnail image is set in the selected state and the move button is tapped, the at least one second image to the non-display folder;
    displaying at least one third thumbnail image without displaying the at least one second thumbnail image on the screen after the at least one second image is moved to the non-display folder, the at least one third thumbnail image being obtained by excluding the at least one second thumbnail image from the first thumbnail images;
    updating the table of folder attribute information by setting the non-display attribute for the non-display folder to which the at least one second image is moved; and
    reading images from an image folder for which the display attribute is set in the table of folder attribute information.

11. An electronic device comprising:
    a nonvolatile memory that comprises a display folder storing images and a non-display folder, the nonvolatile memory further stores a table of folder attribute information that comprises a display attribute or a non-display attribute for each image folder; and
    a hardware processor configured to:
        read first images storing in the display folder,
        display first thumbnail images of the first images and a displayable element, wherein an instruction for moving at least one second image to the non-display folder is generated in response to selection of the displayable element, the at least one second image corresponds to at least one second thumbnail image, and the at least one second thumbnail image is selected from the first thumbnail images,
        update the table of folder attribute information by setting the non-display attribute for the non-display folder to which the at least one second image is moved, and
        read images from an image folder to which the display attribute is set in the table of folder attribute information.

12. The electronic device of claim 11, wherein the hardware processor being further configured to:
    set, when the at least one second thumbnail image is selected from the first thumbnail images by a user operation, the at least one second thumbnail image in a selected state, wherein the at least one second image corresponding to the at least one second thumbnail image is to be moved to the non-display folder.

13. The electronic device of claim 12, wherein the hardware processor being further configured to:
    move, when the at least one second thumbnail image is set in the selected state and the displayable element is selected upon being tapped by a user, the at least one second image to the non-display folder.

14. The electronic device of claim 13, wherein the hardware processor being further configured to:
    display at least one third thumbnail image without displaying the at least one second thumbnail image after the at least one second image is moved to the non-display folder, the at least one third thumbnail image being obtained by excluding the at least one second thumbnail image from the first thumbnail images.

15. The electronic device of claim 14, wherein
    the nonvolatile memory further stores an import history table that comprises records for external devices, each of the records comprising a device identification data (ID) and a last import date and time, and
    the hardware processor is further configured to:
        receive, when images stored in a first external device are to be imported, a first device ID of the first external device,
        read, when the import history table comprises a first record comprising the first device ID, a first last import date and time from the first record,
        read fourth thumbnail images from the first external device, the fourth thumbnail images corresponding to fourth images that are stored in the first electronic device and are produced after the first last import date and time, and
    display, on the screen, the fourth thumbnail images that are set in the selected state.

16. The electronic device of claim 15, wherein the hardware processor is further configured to:
    set each of the fourth thumbnail images in the selected state or in a non-selected state in accordance with a selection operation by the user; and
    import, from the first external device to the display folder in the nonvolatile memory, at least one fifth image corresponding to at least one fifth thumbnail image of the fourth thumbnail images, the at least one fifth thumbnail image being in the selected state.

17. The electronic device of claim 15, wherein the hardware processor is further configured to display the fourth thumbnail images in a view area, and
    wherein the view area comprises information indicative of the first last import date and time of the first external device and a check box for specifying images produced after the first last import date and time.

18. The electronic device of claim 17, wherein the hardware processor is configured to set, when the check box is checked, the fourth thumbnail images in the selected state, the fourth thumbnail images corresponding to the fourth images that are produced after the first last import date and time.

19. The electronic device of claim 15, wherein the hardware processor is further configured to overwrite the first last import date and time in the first record with an import date and time when importing the at least one fifth image is completed.

20. The electronic device of claim 15, wherein the hardware processor is further configured to add, when the import history table does not comprise a record comprising the first device ID, a record that comprises the first device ID and a last import date and time to the import history table.

* * * * *